United States Patent
Asauchi et al.

(10) Patent No.: US 7,522,470 B2
(45) Date of Patent: Apr. 21, 2009

(54) SEMICONDUCTOR MEMORY DEVICE

(75) Inventors: Noboru Asauchi, Nagano-ken (JP); Eitaro Otsuka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 330 days.

(21) Appl. No.: 11/420,535

(22) Filed: May 26, 2006

(65) Prior Publication Data
US 2008/0144382 A1 Jun. 19, 2008

(30) Foreign Application Priority Data
May 30, 2005 (JP) ............................ 2005-157181
Jun. 23, 2005 (JP) ............................ 2005-182808

(51) Int. Cl.
*G11C 8/00* (2006.01)
(52) U.S. Cl. ............................... 365/239; 365/189.011; 365/220; 365/221
(58) Field of Classification Search .................. 365/239, 365/189.011, 220, 221
See application file for complete search history.

(56) References Cited

U.S. PATENT DOCUMENTS

| | | | |
|---|---|---|---|
| 4,792,926 A * | 12/1988 | Roberts | 365/189.02 |
| 5,231,592 A | 7/1993 | Itoh | |
| 6,494,559 B1 | 12/2002 | Tsuji | |
| 6,749,281 B2 | 6/2004 | Asauchi | |
| 6,798,695 B2 | 9/2004 | Boch et al. | |
| 6,836,853 B1 | 12/2004 | Dover et al. | |

FOREIGN PATENT DOCUMENTS

| | | |
|---|---|---|
| DE | 102 01 553 A1 | 3/2003 |
| EP | 1 136 268 A1 | 9/2001 |
| EP | 1 473 164 A2 | 11/2004 |
| JP | 05-282879 A | 10/1993 |
| JP | 2001-166649 A | 6/2001 |
| JP | 2001-189083 | 7/2001 |
| JP | 2001-339291 A1 | 12/2001 |
| JP | 2002-370383 A1 | 12/2002 |
| JP | 2004-242891 A | 9/2004 |
| WO | 01/25017 A1 | 4/2001 |

OTHER PUBLICATIONS

International Search Report from PCT/JP2006/311050 (with English translation), dated Aug. 15, 2006.
English Translation of International Preliminary Report on Patentability from PCT/JP2006/311050, dated Dec. 21, 2007.

* cited by examiner

*Primary Examiner*—Son Dinh
*Assistant Examiner*—Nam Nguyen
(74) *Attorney, Agent, or Firm*—Stroock & Stroock & Lavan LLP

(57) ABSTRACT

When the input write data is a value of a value greater than the existing data of the memory array 100, the semiconductor memory device enables writing of input write data to the memory array 100. In specific terms, the increment controller 150 reads the existing data from the memory array 100, and compares it with the write data latched to the 8-bit latch register 170. When the value of the write data is a value greater than the existing data, the increment controller 150 outputs the write enable signal WEN1 to the write/read controller 140, and executes writing of the write data latched to the 8-bit latch register 170 to the memory array 100.

31 Claims, 15 Drawing Sheets

Fig.2

|   | A0 | A1 | A2 | A3 | A4 | A5 | A6 | A7 |
|---|----|----|----|----|----|----|----|----|
| 1 | 00H | ID |   |   |   |   |   | 07H |
| 2 | 08H |   |   | WRA |   |   |   | 0FH |
| 3 | 10H |   |   |   |   |   |   | 17H |
| 4 | 18H |   |   |   |   |   |   |   |
| 5 |   |   |   |   |   |   |   |   |
| 6 |   |   |   |   |   |   |   |   |
| 7 |   |   |   |   |   |   |   |   |
| 8 |   |   |   |   |   |   |   |   |
| 9 |   |   |   | WPA |   |   |   |   |
| 10 |   |   |   |   |   |   |   |   |
| 11 |   |   |   |   |   |   |   |   |
| 12 |   |   |   |   |   |   |   |   |
| 13 |   |   |   |   |   |   |   |   |
| 14 |   |   |   |   |   |   |   |   |
| 15 |   |   |   |   |   |   |   |   |
| 16 |   |   |   |   |   |   |   | 7FH |

⎫ 101

| 17 | 80H |   |   |   |   |   |   |   |
| 18 |   |   |   |   |   |   |   |   |
| 19 |   |   |   |   |   |   |   |   |
| 20 |   |   |   |   |   |   |   |   |
| 21 |   |   |   |   |   |   |   |   |
| 22 |   |   |   |   |   |   |   |   |
| 23 |   |   |   |   |   |   |   |   |
| 24 |   |   |   |   |   |   |   | BFH |

| | ←MSB | | | | | | | Address (HEX) | | | | | | | LSB→ | |
|---|---|---|---|---|---|---|---|---|---|---|---|---|---|---|---|---|
| | 1st write-restricted row | | | | | | | | 2nd write-restricted row | | | | | | | |
| | 08 | 09 | 0A | 0B | 0C | 0D | 0E | 0F | 10 | 11 | 12 | 13 | 14 | 15 | 16 | 17 | |
| Existing data | 0 | 0 | 0 | 0 | 0 | 0 | 0 | 0 | 0 | 0 | 0 | 0 | 0 | 0 | 0 | 0 | |
| Write data | 0 | 0 | 0 | 0 | 0 | 0 | 0 | 0 | 0 | 0 | 0 | 0 | 0 | 0 | 0 | 1 | Write enabled |
| Existing data | 0 | 0 | 0 | 0 | 0 | 0 | 0 | 0 | 0 | 0 | 0 | 0 | 0 | 0 | 0 | 1 | |
| Write data | 0 | 0 | 0 | 0 | 0 | 0 | 0 | 0 | 0 | 0 | 0 | 0 | 0 | 0 | 0 | 0 | Write not enabled |
| Existing data | 0 | 1 | 0 | 0 | 0 | 1 | 0 | 1 | 1 | 0 | 1 | 0 | 0 | 0 | 1 | 0 | |
| Write data | 1 | 0 | 1 | 1 | 1 | 0 | 1 | 0 | 0 | 1 | 0 | 1 | 1 | 1 | 0 | 1 | Write enabled |
| Existing data | 1 | 0 | 1 | 1 | 1 | 1 | 1 | 0 | 0 | 1 | 1 | 1 | 0 | 1 | 1 | 1 | |
| Write data | 0 | 1 | 0 | 0 | 0 | 0 | 0 | 1 | 1 | 0 | 0 | 0 | 1 | 0 | 1 | 0 | Write not enabled |

SEMICONDUCTOR MEMORY DEVICE

CROSS-REFERENCE TO RELATED APPLICATION

This application relates to and claims priority from Japanese Patent Application No. 2005-157181, filed on May 30, 2005, and Japanese Patent Application No. 2005-182808, filed on Jun. 23, 2005 the entire disclosure all of which are incorporated by reference.

BACKGROUND OF THE INVENTION

1. Field of the Invention

The present invention relates to a sequentially accessed semiconductor memory device and to a method of controlling writing of data to a sequentially accessed semiconductor memory device.

2. Description of the Related Art

Rewritable semiconductor memory devices, such as EEPROMs, flash ROM, and the like, are used broadly as memory devices in a variety of electronic equipment. In electronic devices, this type of semiconductor memory device is not limited in terms of overwriting inputted data that fulfills data conditions established in advance, however, in some cases it would be desirable to use these semiconductor memory devices under conditions that restrict the overwriting with input data that does not fulfill these data conditions. For example, such conditions may include, for example, "perform writing only if the write data is larger than the data that is recorded in the semiconductor memory device (hereinafter termed the "data to be overwritten")," or the condition of "perform writing only if the write data is smaller than the data to be overwritten."

However, conventional rewritable semiconductor memory devices have no system by which to limit the overwriting of data, and because it is possible to overwrite data that has been stored if the prescribed sequence for writing data is performed, it has not been possible to apply data conditions, such as described above, to overwriting.

Note that, as technologies for controlling the writing of data to a memory device, there is a known technology for providing a write-prevention device for a memory device external to said memory device, and a known technology for preventing writing to a data storage area when the memory device is as used by writing data indicating the prohibition of writing to a data storage area with an address beyond a particular data storage area in the memory device.

Moreover, Semiconductor memory devices that allow only sequential access to the data cells of a memory array, for example, EEPROMs, are known. This kind of semiconductor memory device is relatively inexpensive, so is used as a storage device for holding data related to the remaining volume of or consumed volume of consumer goods. Here, consumer goods decrease with use, so when the data used for updating, specifically, the data written to the memory array is data relating to consumption volume, the value of the written data must be a value that is greater than the value of the existing data already stored in the memory array. Meanwhile, when the data written to the memory array is data relating to the remaining volume, the value of the written data must be a value that is smaller than the value of the existing data already stored in the memory array.

SUMMARY OF THE INVENTION

However, for example, there are cases when data change occurs during transfer of data input to the semiconductor memory device, and in this case, even when correct data rewrite is performed in the semiconductor memory device, there will be erroneous data recorded in the semiconductor memory device. Specifically, for example, when data is characterized by increasing, there is the risk that data of a value that is smaller than the existing data will be written to the semiconductor memory device. Here, when data relating to the remaining volume or consumption volume of the consumer goods is used to suppress or prevent damage or problems with the device that uses the consumer goods, when the data relating to the remaining volume or consumption volume of consumer goods that was originally characterized by increasing or decreasing changes to the opposite direction, there are cases when problems occur with the device that uses the consumer goods.

The present invention was created to address the problems noted above, and the purpose is to limit writing of data of values opposite to the increase or decrease characteristics held by the write data for a semiconductor memory device. Another object of the present invention is to prohibit writing, in the semiconductor memory device, of input data that does not fulfill specific data requirements.

A first aspect of the present invention to address the problems noted above provides a semiconductor memory device. The semiconductor memory device of the first aspect of the present invention has a sequentially accessed non-volatile memory array that has a write restricted storage address of a predetermined address unit that stores data characterized by the value increasing, write data holding module that holds write data to be written to the write restricted storage address using a predetermined address unit, data writing module that writes the held write data to the write restricted storage address using the predetermined address unit, reading module that reads existing data stored in the write restricted storage address in the memory array, determination module that determines whether or not the value of the held write data is the value of the read existing data or greater, and a control unit that, when the value of the write data is the value of the existing data or greater, executes writing of the write data to the write restricted storage address of the memory array using the writing module.

In the semiconductor memory device of the first aspect of the present invention, when the value of the write data is less than the value of the existing data, the control unit may not execute writing of the write data to the write restricted storage address.

In accordance with the semiconductor memory device of the first aspect of the present invention, using the determination module, a determination is made of whether or not the value of the stored write data is a value that is the value of the read existing data or greater, and when the value of the write data is the value of the existing data or greater, the control unit executes writing of the write data to the write restricted storage address of the memory array using the write module. Therefore, it is possible to limit writing of data of a value opposite to the characteristics of the write data for which the value increases.

According to the semiconductor memory device of the first aspect of the present invention, when the write restricted storage address count is n times (n is a natural number) of the predetermined address unit, the determination module may determine whether or not the value of the write data is the value of the existing data or greater for each of the predetermined address units, and for all the write restricted storage addresses, when the value of the existing data is the value of the write data or greater, the control unit may execute writing of the write data using the write module to all the write restricted storage addresses of the memory array.

According to the semiconductor memory device of the first aspect of the present invention, for any of the addresses of the write restricted storage addresses, when the value of the write data is less than the value of the existing data, the control unit may not execute writing of the write data to all the write restricted storage addresses.

In the above case, when the semiconductor memory device has a plurality of write restricted storage addresses, it is possible to limit writing of data of values opposite to the characteristics of the write data for which the value increases for all the write restricted storage addresses.

According to the semiconductor memory device of the first aspect of the present invention, the determination module may read for each 1 address the write data from the write data holding module each time the existing data is read for each 1 address by the reading module, and determines whether or not the value of the write data is a value that is the value of the read existing data or greater. In this arrangement, it is possible to determine whether or not the value of the write data is a value that is the value of the read existing data or greater without requiring a structure for storing the read existing data.

According to the semiconductor memory device of the first aspect of the present invention, the determination module may use the existing data of the predetermined address unit read for each 1 address by the reading module and the write data of the predetermined address unit held in the write data holding module, and determine whether or not the value of the write data is a value that is the value of the read existing data or greater. In this arrangement, it is possible to determine whether or not the value of the write data is a value that is the value of the read existing data or greater consolidated with a predetermined address unit.

According to the semiconductor memory device of the first aspect of the present invention, data may be stored in order from the most significant bit in the write restricted storage address in the memory array, and the data writing module may execute writing of data in order from the most significant bit to the memory array. In this arrangement, it is possible to more quickly execute determination of whether or not the value of the write data is a value that is the value of the read existing data or greater.

When the characteristics of the written data has the characteristic of the value decreasing, the semiconductor memory device of the first aspect of the present invention may also be such that it has a sequentially accessed non-volatile memory array that has a write restricted storage address of a predetermined address unit that stores data characterized by the value decreasing, write data holding module that holds write data to be written to the write restricted storage address using a predetermined address unit, data writing module that writes the held write data to the write restricted storage address using the predetermined address unit, reading module that reads existing data stored in the write restricted storage address for each 1 address in the memory array, determination module that determines whether or not the value of the held write data is the value of the read existing data or less, and a control unit that, when the value of the write data is the value of the existing data or less, executes writing of the write data to the write restricted storage address of the memory array using the writing module.

When the value of the write data is greater than the value of the existing data, the control unit may not execute writing of the write data to the write restricted storage address.

When the characteristics of the written data have the characteristic of the value decreasing, the semiconductor memory device of the first aspect of the present invention may be such that the determination module may determine whether or not the value of the held write data is a value that is the value of the read existing data or less, and when the value of the write data is the value of the existing data or less, the control unit may execute writing of the write data to the write restricted storage address of the memory array using the writing module. Also, when the value of the write data is greater than the value of the existing data, writing of the write data to the write restricted storage address may be not executed, so it is possible to limit writing of data of the value that is opposite to the characteristic of the write data for which the value decreases.

A second aspect of the present invention provides a semiconductor memory device that stores data characterized by the value increasing as rewritable data. The semiconductor memory device of the second aspect of the present invention has a non-volatile memory array that is sequentially accessed and for which there are 8 data cells that store one bit of data per 1 row, and that has a write restricted row that stores the rewritable data, data receiving module that receives write data in 8 bit multiples to be written to the write restricted row of the memory array, write data holding module that holds 8 bits of write data of the received write data, data writing module that writes the held 8 bits of write data in 8-bit units to the write restricted row, reading module that reads existing data stored in the data cell of the write restricted row in 1-bit units in the memory array, a determination module that determines for each 8-bit unit of write data whether or not the value of the write data is a value that is the value of the read existing data or greater, and a control unit that, when the value of the write data is less than the value of the existing data for any of the 8-bit unit write data, the control unit does not execute writing of the write data to all the subject data cells of the write restricted row using the writing module.

In the semiconductor memory device of the second aspect of the present invention, when the value of the write data is the value of the existing data or greater for all the 8-bit unit write data, may execute writing of the write data to all the subject data cells of the write restricted row.

In accordance with the semiconductor memory device of the second aspect of the present invention, a determination of whether or not the value of the write data is a value that is the value of the read existing data or greater using the determination module for each 8-bit unit write data, and when the value of the write data is the value of the existing data or greater for all the 8-bit unit write data, writing of the write data is executed to all the subject data cells of the write restricted row using the write module. Also, when the value of the write data is lower than the value of the existing data for any of the 8-bit unit write data, the control unit does not execute writing of write data to all the subject data cells of the write restricted line. Therefore, it is possible to limit writing of data of values opposite to the characteristics of write data for which the value increases.

In accordance with the semiconductor memory device of the second aspect of the present invention, the determination module may read the write data from the write data holding module for each 1 bit with each time the existing data is read for each 1 bit by the reading module, and may determine whether or not the value of the write data is a value that is the value of the read existing data or greater. In this case, it is possible to determine whether or not the value of the write data is a value that is the value of the read existing data or greater without requiring a structure for storing the read existing data.

In accordance with the semiconductor memory device of the second aspect of the present invention, the determination module may determine whether or not the value of the write data is a value that is the value of the read existing data or greater with using the 8-bit multiple existing data read for each 1 address by the reading module and the 8-bit multiple write data held in the write data holding module. In this arrangement, it is possible to determine whether or not the value of the write data is a value that is the value of the read existing data or greater consolidated as 8-bit units.

In accordance with the semiconductor memory device of the second aspect of the present invention, data may be stored in sequence from the most significant bit in the data cell of the write restricted row, and the data write module may execute writing of data in sequence from the most significant bit to the memory array.

When the characteristics of the write data have the characteristic of the value decreasing, the semiconductor memory device of the second aspect of the present invention may have a non-volatile memory array that is sequentially accessed and for which there are 8 data cells that store one bit of data per 1 row, and that has a write restricted row that stores the rewritable data, data receiving module that receives write data in 8 bit multiples to be written to the write restricted row of the memory array, write data holding module that holds 8 bits of write data of the received write data, data writing module that writes the held 8 bits of write data in 8-bit units to the write restricted row, reading module that reads existing data stored in the data cell of the write restricted row in 1-bit units in the memory array, a determination module that determines for each 8-bit unit of write data whether or not the value of the write data is a value that is the value of the read existing data or less, and a control unit that, when the value of the write data is greater than the value of the existing data for any of the 8-bit unit write data, the control unit does not execute writing of the write data to all the subject data cells of the write restricted row using the writing module.

When the value of the write data is the value of the existing data or less for all the 8-bit unit write data, executes writing of the write data to all the subject data cells of the write restricted row.

When the characteristics of the write data have the characteristic of the value decreasing, the semiconductor memory device of the second aspect of the present invention may use the determination module to determine whether or not the value of the write data is a value that is the value of the read existing data or greater, and when a determination is made for each 8-bit unit of write data and it is determined that the value of the write data is the value of the existing data or less for all the 8-bit unit write data, writing of the write data is executed to all the subject data cells of the write restricted row by the writing module. Also, when the value of the write data is a value greater than the value of the existing data for any of the 8-bit unit write data, writing of the write data is not executed to all the subject data cells of the write restricted row. Therefore, it is possible to limit writing of data of values opposite to the characteristics of the write data for which the value decreases.

A third aspect of the present invention provides a method of controlling writing of data to a semiconductor memory device that has a non-volatile memory array that has a write restricted storage address of a predetermined address unit that stores data characterized by the value increasing, and for which data is written in predetermined address units to the memory array. The method according to the third aspect of the present invention reads the existing data stored in the write restricted storage address for each 1 address in the memory array, determines whether or not the write data written to the write restricted storage address is a value that is the value of the read existing data or less, and does not write the write data to the write restricted storage address in the predetermined address units when the write data value is the existing data value or less.

When the characteristics of the written data have the characteristic of the value decreasing, the method of the third aspect of the present invention may also include reading the existing data stored in the write restricted storage address for each 1 address in the memory array, determining whether or not the value of the write data written to the write restricted storage address is a value that is the value of the read existing data or greater, and not writing the write data to the write restricted storage address in the predetermined address units when the write data value is the existing data value or greater.

According to the method of controlling writing of data of the third aspect of the present invention, it is possible to obtain the same effects as the semiconductor memory device of the first aspect of the present invention, and the method of controlling writing of data of the third aspect of the present invention may be realized in various aspects the same as with the semiconductor memory device of the first aspect of the present invention.

A fourth aspect of the present invention provides a method of controlling writing of data to a semiconductor memory device that has a non-volatile memory array that has a write restricted row to store rewritable data characterized by the value increasing, this being sequentially accessed and having 8 data cells that store 1 bit of data per 1 row, and for which data is written in 8-bit units to the memory array. The method of the fourth aspect of the present invention includes receiving the write data in 8-bit multiples to be written to the memory array, holding 8 bits of write data of the received write data, reading the existing data stored in the data cell of the write restricted row in 1 bit units in the memory array, determining whether or not the value of the write data is a value that is the value of the read existing data or less for each 8-bit unit write data, and when the value of the write data is the value of the existing data or less for all the 8-bit unit write data, not writing the write data to all the data cells of the write restricted row.

When the characteristics of the written data have the characteristic of the value decreasing, the method of the fourth aspect of the present invention may also include receiving the write data in 8-bit multiples to be written to the memory array, holding 8 bits of write data of the received write data, reading the existing data stored in the data cell of the write restricted row in 1 bit units in the memory array, determining whether or not the value of the write data is a value that is the value of the read existing data or greater for each 8-bit unit write data, and when the value of the write data is the value of the existing data or greater for all the 8-bit unit write data, writing the write data to all the data cells of the write restricted row.

According to the method of controlling writing of data of the fourth aspect of the present invention, it is possible to obtain the same operating effect as the semiconductor memory device of the second aspect of the present invention, and the method of controlling writing of data of the fourth aspect of the present invention may also be realized in various aspects in the same way as the semiconductor memory device of the second aspect of the present invention.

The method of the third and fourth aspects of the present invention may further be realized as a program, and a computer readable medium on which the program is recorded.

A fifth aspect of the present invention provides a semiconductor memory device. The semiconductor memory device according to the fifth aspect of the present invention is provided with a non-volatile memory array, and a read/write controller for controlling the writing of data to said memory array, and the reading of data from said memory array, where, when the writing of data to said memory array has been requested, said read/write controller compares the value of multibit inputted write data to the value of multibit stored data that is stored in a multibit memory area to which said multibit write data is to be written, and for said multibit write data that fulfills a specific magnitude relationship, performs the writing to said multibit memory area, but for said multibit write data that does not fulfill said magnitude relationship, prohibits the writing to said multibit memory area.

In accordance with the semiconductor memory device according to the fifth aspect of the present invention, it is possible to prohibit the writing of write data that does not fulfill a specific magnitude relationship with stored data.

The semiconductor memory device according to the fifth aspect of the present invention may be arranged as follows. The semiconductor memory device according to the fifth aspect of the present invention may be provided with a non-volatile memory array and a read/write controller for controlling the writing of data to said memory array and the reading of data from said memory array, where, when there is a request to write data to said memory array, said read/write controller compares the value of inputted multibit write data to the value of multibit stored data that is stored in a multibit memory area to which said multibit write data is to be written, doing so sequentially by a single-bit unit beginning with the most significant bit of said multibit write data, where if there is a bit that is judged to fulfill a specific magnitude relationship relative to each bit value of said stored data, writing is performed for the write data from that bit forward, but if there is a bit for which said specific magnitude relationship is not fulfilled, writing is prohibited for the write data from that bit forward.

In accordance with the semiconductor memory device according to the fifth aspect of the present invention, provided with the aforementioned structure, in a semiconductor memory device wherein data access is performed by the single-bit unit the writing of write data that does not fulfill a specific magnitude relationship relative to stored data may be prohibited easily.

Note that the semiconductor memory device according to the fifth aspect of the present invention may also be embodied as a method of writing to a semiconductor memory device, a computer program, or a computer readable medium on which such a program is recorded.

A sixth aspect of the present invention provides a semiconductor memory device. The semiconductor memory device according to the sixth aspect of the present invention is provided with a non-volatile memory array for storing consumed material quantity data, which is data pertaining to a quantity of consumed material, having a characteristic that increases a value, data writing module that write new consumed material quantity data, to be stored in said memory array, reading module that read existing consumed material quantity data, which has already been stored, from said memory array; and a control unit for performing the writing of said new consumed material quantity data, through said data writing means, when the value of said new consumed material quantity data is greater than or equal to the value of said existing consumed material quantity data, but not writing said new consumed material quantity data, using said data writing means, when the value of said new consumed material quantity data is less than the value of said existing consumed material quantity data.

According to the semiconductor memory device of the sixth aspect of the present invention, it is possible to obtain the same operating effect as the semiconductor memory device of the first and second aspects of the present invention.

The semiconductor memory device as set forth in the first, second, fifth, and sixth forms according to the present invention may be used installed in a print recording material container for containing a print recording material, detachably mounted onto a printing device in order to store data pertaining to the quantity of said print recording material. In this case, it is possible to improve the reliability of information pertaining to the quantity of the print recording material.

The seventh aspect of the present invention provides a printing system comprising a printing device and a print recording material receptor that has a semiconductor memory device according to the first, second, fifth, and sixth aspects of the present invention, detachably mounted onto the printing device. In the printing system according to the sixth aspect of the present invention, the printing device includes a host computer, wherein the host computer is connected to a semiconductor memory device of the print recording material receptor through a data signal line, a clock signal line, a reset signal line, a positive power supply line and a negative power supply line, and sends data of the quantity of the print recording material consumed in the printing device to the semiconductor memory device; and the semiconductor memory device attached to said print recording material receptor stores, in said memory array, the quantity data regarding the print recording material that has been received. According to the seventh aspect of the present invention makes it possible to improve the reliability of writing data that is longer than the data length that can be stored in a single row in the memory array provided in the semiconductor memory device when storing information regarding the quantity of the print recording material that is consumed during printing.

BRIEF DESCRIPTION OF THE DRAWINGS

FIG. 2 is an explanatory drawing typically showing the internal configuration map of the memory array equipped in the semiconductor memory device of the first embodiment.

FIG. 8 is an explanatory drawing showing an example of the results of the increment confirmation process of the first embodiment.

DESCRIPTION OF THE PREFERRED EMBODIMENTS

Figure 1:
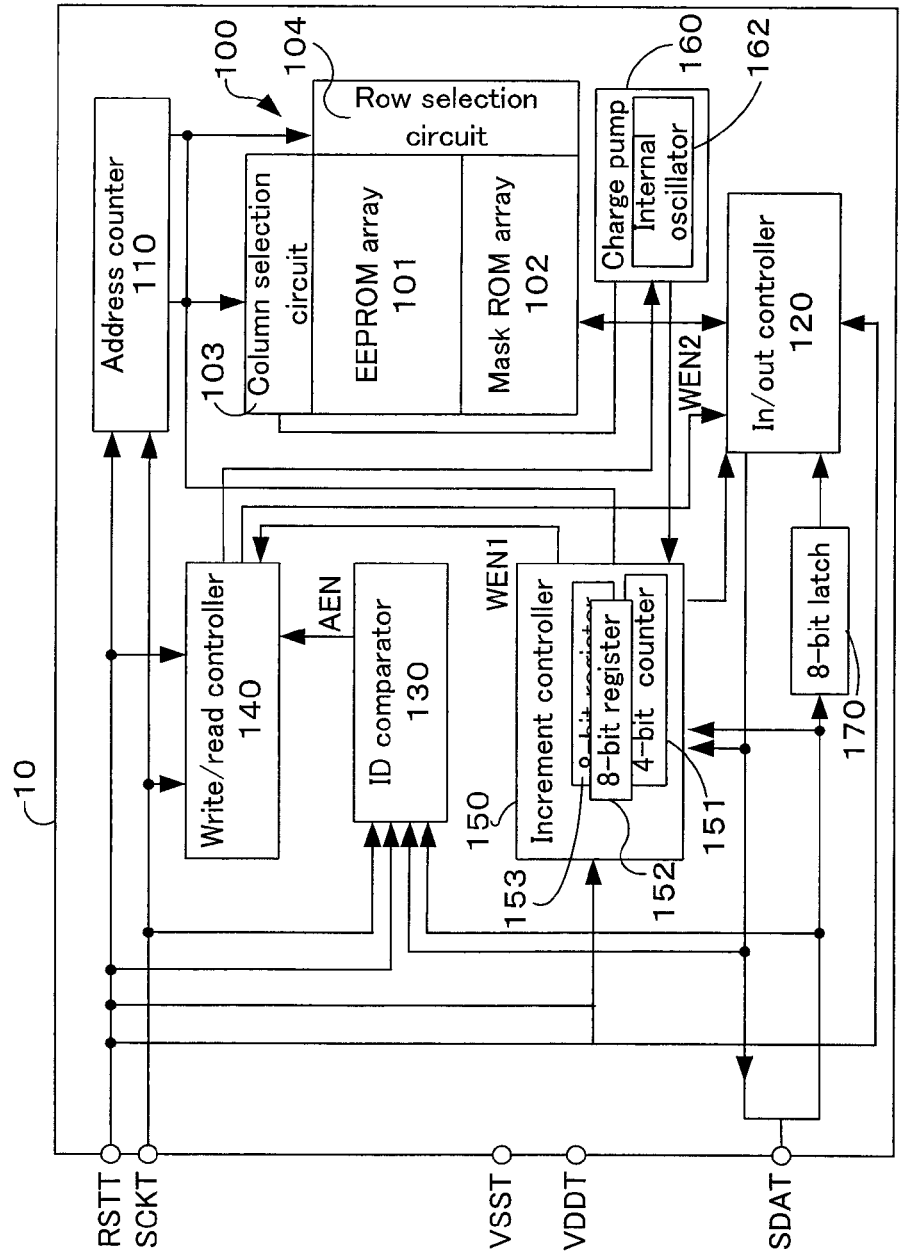
FIG. 1 is a block diagram showing the functional internal configuration of the semiconductor memory device of a first embodiment.

Following, the semiconductor memory device and the method of controlling writing data to the semiconductor device of the present invention are described based on embodiments while referring to the drawings.

Constitution of the Semiconductor Memory Device

The constitution of the semiconductor memory device of the first embodiment will be described while referring to FIG. 1 and FIG. 2. FIG. 1 is a block diagram showing the functional internal structure of the semiconductor memory device of the first embodiment. FIG. 2 is an explanatory drawing typically showing the internal structural map of the memory array that the semiconductor memory device of the first embodiment has.

The semiconductor memory device of this embodiment is a sequential access method memory device that does not require input of address data that specified the address of the access destination from outside. The semiconductor memory device 10 has a memory array 100, an address counter 110, an in/out controller 120, and ID comparator 130, a write/read controller 140, an increment controller 150, a charge pump circuit 160, and an 8-bit latch register 170. Each of these circuits is connected by a bus type signal line.

The memory array 100 has an EEPROM array 101 and a mask ROM array 102. The EEPROM array 101 is a storage area having the EEPROM characteristics of being able to electrically erase and write data, and when writing data, the EEPROM array 101 used for this embodiment can write data directly without erasing existing data. The mask ROM array 102 is a storage area that has the mask ROM characteristics of not being able to erase or rewrite data written during the manufacturing process.

There is a plurality of data cells (memory cells) that store 1 bit of information typically shown in FIG. 2 in the EEPROM array and the mask ROM array 102 of the memory array 100. With this embodiment, as shown in FIG. 2, the memory array 100 has 8 address per row (an address of 8 bits of data) as the predetermined address unit, and for example, it is possible to arrange 9 data cells (8 bits) in one row and 16 data cells (16 words) in one row to store 16 words×8 bits (128 bits) of data in the EEPROM array 101. It is possible to arrange 8 data cells (8 bits) in one row and 8 data cells (8 words) in one row to store 8 words×8 bits (64 bits) of data in the mask ROM array 102.

The address map of the memory array 100 will be described while referring to FIG. 2. The memory array 100 of this embodiment includes the EEPROM array 101 and the mask ROM array 102 as described previously. Identification information (ID information) to identify each semiconductor memory device is stored in the leading 3 addresses (A0 to A2 columns of the first row, 3 bits) of the EEPROM array 101. Writing to the first row including the leading 3 addresses is prohibited, and for example, it is not possible to rewrite after factory shipping.

With the example of FIG. 2, 16 bits of information that are rewritable under fixed conditions are stored in the 9th address (08H) to 16th address (0FH) and the 17th address (10H) to 24th address (07H) of the EEPROM array 101. Note that with this embodiment, the row constituted by this 9th address to 16th address and 17th address to 24th address is sometimes called a write restricted row, or each of the 8 addresses of this 9th address to 16th address and 17th address to 24th address is called a write restricted storage address of a predetermined address unit. Also, fixed conditions are, for example, when the value of the write data is greater than the value of the existing data in cases when the stored information is information relating to ink consumption volume, or when the value of the write data is smaller than the value of the existing data when the stored information is information relating to the remaining ink volume.

The 25th address and thereafter of the EEPROM 101 is a read-only area for which writing is prohibited, and writing is not possible after factory shipping, for example.

The mask ROM array 102 has information (data) written when the memory array is manufactured, and after the memory array is manufactured, it is not possible to execute write even before factory shipping.

The memory array 100 of this embodiment has the plurality of rows using 8 bits as a unit as described above, but each row is not an independent data cell row, but rather is realized by one data cell row being bent using 8 bit units. Specifically, for descriptive purposes, this is nothing more than calling the row including the 9th bit the second byte, and calling the row including the 17th bit the third byte. As a result, to access a desired address in the memory array 100, it is necessary to access in sequence from the start, to do access using the so-called sequential access method, and direct access to a desired address which is possible with the random access method becomes impossible.

A word line and a bit (data) line are connected to each data cell in the memory array 100, and by selecting (applying a selection voltage) the corresponding word line (row), and applying a write voltage to the corresponding bit line, data is written to the data cell. Also, by selecting the corresponding word line (row) and connecting the corresponding bit line and the in/out controller 120, the data (1 or 0) of the data cell is read according to whether or not current is detected. Note that the predetermined address unit of this embodiment can be said to be the number of addresses (number of data cells) for which write is possible by applying a write voltage to one word line.

The column selection circuit 103 has the columns (bit lines) connected to the in/out controller 120 in sequence according to the external clock pulse count counted by the address counter 110. The row selection circuit 104 applies a selection voltage to rows (word lines) in sequence according to the external clock pulse count counted by the address counter 110. Specifically, with the semiconductor memory device 10 of this embodiment, access to the memory array 100 using the address data is not executed, and access to the desired address is executed according to the clock pulse count counted by the exclusive address counter 110.

The address counter 110 is connected to a reset signal terminal RSTT, a clock signal terminal SCKT, a column selection circuit 103, and a row selection circuit 104. The address counter 110 is reset to the initial value by setting the reset signal input via the reset signal terminal RSTT to 0 (or low), and after the reset signal is set to 1, synchronization is done to the fall of the clock pulse input via the external clock signal terminal SCKT, and the clock pulse count is counted (the count value is incremented). The address counter 110 used for this embodiment is an 8-bit address counter that stores 8 clock pulse counts corresponding to the one row cell count (bit count) of the memory array 100. Note that the initial value can be any value as long as it is associated with the leading position of the memory array 100, and typically, 0 is used as the initial value.

The in/out controller 120 is a circuit for transferring write data input to the data signal terminal SDAT to the memory array 100, or for receiving data read from the memory array 100 and outputting it to the data signal terminal SDAT. The in/out controller 120 is connected to the data signal terminal SDAT, the reset signal terminal RSTT, the memory array 100, and the write/read controller 140, and controls switching of the data transfer direction to the memory array 100 and the data transfer direction (of the signal line connected to the data signal terminal SDAT) to the data signal terminal SDAT according to the request from the write/read controller 140. An 8-bit latch register 170 that temporarily stores write data input from the data signal terminal SDAT is connected to the input signal line from the data signal terminal SDAT to the in/out controller 120.

The data column (MSB) input via the input signal line from the data signal terminal SDAT to the 8-bit latch register 170 is held until it reaches 8 bits, and when 8 bits are gathered, the held 8 bits of data are written to the EEPROM array 101. The 8-bit latch register 170 is a so-called FIFO type shift register, and when it is newly latched at the 9th bit of the input data, the already latched 1st bit of data is released.

The in/out controller 120 prohibits data input to the data signal terminal SDAT by setting the data transfer direction to the memory array 100 to the reading direction when the power is on and during reset, and by using high impedance for the input signal line between the 8-bit latch register 170 and the in/out controller 120. This status is maintained until a write process request is input from the write/read controller 140. Therefore, the leading 4-bit data of the data column input via the data signal terminal SDAT after reset signal input is not written to the memory array 100, and meanwhile, the data stored in the leading 4 bits (of these, the 4th bit is Don't care) of the memory array 100 is sent to the ID comparator 130. As a result, the leading 4 bits of the memory array 100 are in a read-only state.

The ID comparator 130 is connected to the clock signal terminal SCKT, the data signal terminal SDAT, and the reset signal terminal RSTT, and a determination is made of whether or not the identification data contained in the input data column input via the data signal terminal SDAT and the identification data stored in the memory array 100 (EEPROM array 101) match. To describe this in detail, the ID comparator 100 fetches the leading 3 bits of data of the operation code input after the reset signal RST is input, specifically, the identification data. The ID comparator 130 has a 3-bit register (not illustrated) that stores identification data contained in the input data column, and a 3-bit register (not illustrated) that stores the most significant 3 bits of identification data fetched from the memory array 100 via the in/out controller 120, and determines whether or not the identification data matches by whether or not the values of both registers match. The ID comparator 130 sends the access enable signal EN to the write/read controller 140 when both identification data match. The ID comparator 130 clears the register value when the reset signal RST is input (RST=0 or low).

The write/read controller 140 is connected to the in/out controller 120, the ID comparator 130, the increment controller 150, the charge pump circuit 160, the clock signal terminal SCKT, the data signal terminal SDAT, and the reset signal terminal RSTT. The write/read controller 140 is a circuit that synchronizes to the 4th clock signal after the reset signal RST is input, confirms the write/read control information (information of the 4th bit subsequent to the 3-bit ID information) input via the data signal terminal SDAT, and that switches the internal operation of the semiconductor memory device to write or read. In specific terms, the write/read controller 140 analyzes the fetched write/read command when the access enable signal AEN from the ID comparator 130 and the write enable signal WEN1 from the increment controller WEN1 are input. If this is a write command, the write/read controller 140 switches the bus signal line data transfer direction to the write direction for the in/out controller 120, sends a write enable signal WEN2 that enables writing, and requests generating of a write voltage to the charge pump circuit 160.

With this embodiment, when the write data DI written to the write restricted row is data that has the characteristic of the value increasing (increment), a determination is made of whether or not the write data DI is a value greater than the existing data DE already stored in the write restricted row, and when the write data DI is data having the characteristic of the value decreasing (decrement), a determination is made of whether or not the write data DI is a value smaller than the existing data DE already stored in the write restricted row, and by doing this, data change of the write data DI and inputting of erroneous data are decreased or prevented. This function is provided by an increment controller in the former case and by a decrement controller in the latter case. With this embodiment, an example of the former case is described with the following description.

The increment controller 150 is connected to the reset signal terminal RSTT, the write/read controller 140, and the charge pump circuit 160 via the signal line. The increment controller 150 has internally a 4-bit counter 151 and 8-bit internal registers 152 and 153. The increment controller 150 determines whether or not the write data DI written to the write restricted row is a value greater than the existing data DE already stored in the write restricted row, and further executes a determination (verify, prove) of whether or not the data written to the EEPROM array 101 was written correctly.

The increment controller 150 reads the existing data DE from the write restricted row of the EEPROM array 101 at the timing when the write data DI is latched to the 8-bit latch register 170, and stores it in the internally held 8-bit internal register 152. The increment controller 150 compares the read existing data ED and the write data DI input to the 8-bit latch register 170 in 1-bit units, and determines whether or not the write data DI is data of a value larger than the existing data DE. Note that to accelerate processing, it is preferable that the input write data be MSB first.

The increment controller 150 outputs the write enable signal WEN1 to the write/read controller 140 when the write data DI is a value larger than the existing data DE. Note that when the write restricted row extends over a plurality of rows, the increment controller 150 outputs the write enable signal WEN1 only when the write data DI is data of a value greater than the existing data DE for all the write restricted rows.

After writing the write data, the increment controller 150 verifies whether or not the data was written correctly, and when the write data was not written correctly, writes back the existing data DE stored in the internally equipped 8-bit internal register 152 to the memory array 100. When verifying the write data, the 4-bit counter 151 equipped in the increment controller 150 receives the internal clock signal from an internal oscillator 162 equipped in the charge pump circuit 160 at an 8-bit delay in relation to the external clock signal from the write standby state, and starts counting up. The count value counted up by the 4-bit counter 151 is input to the column selection circuit 103 and the row selection circuit 104, and the just written existing data DE is read.

As described previously, the charge pump circuit 160 is a circuit for supplying via the column selection circuit 103 to the selected bit line the necessary write voltage when writing data to the EEPROM array based on the request signal from the write/read controller 140. The charge pump circuit 160 is equipped with the oscillator 162 that generates the operating frequency necessary during voltage boosting, and by boosting the voltage obtained via the positive electrode power supply terminal VDDT, generates the necessary write voltage.

Read Process

Figure 3:
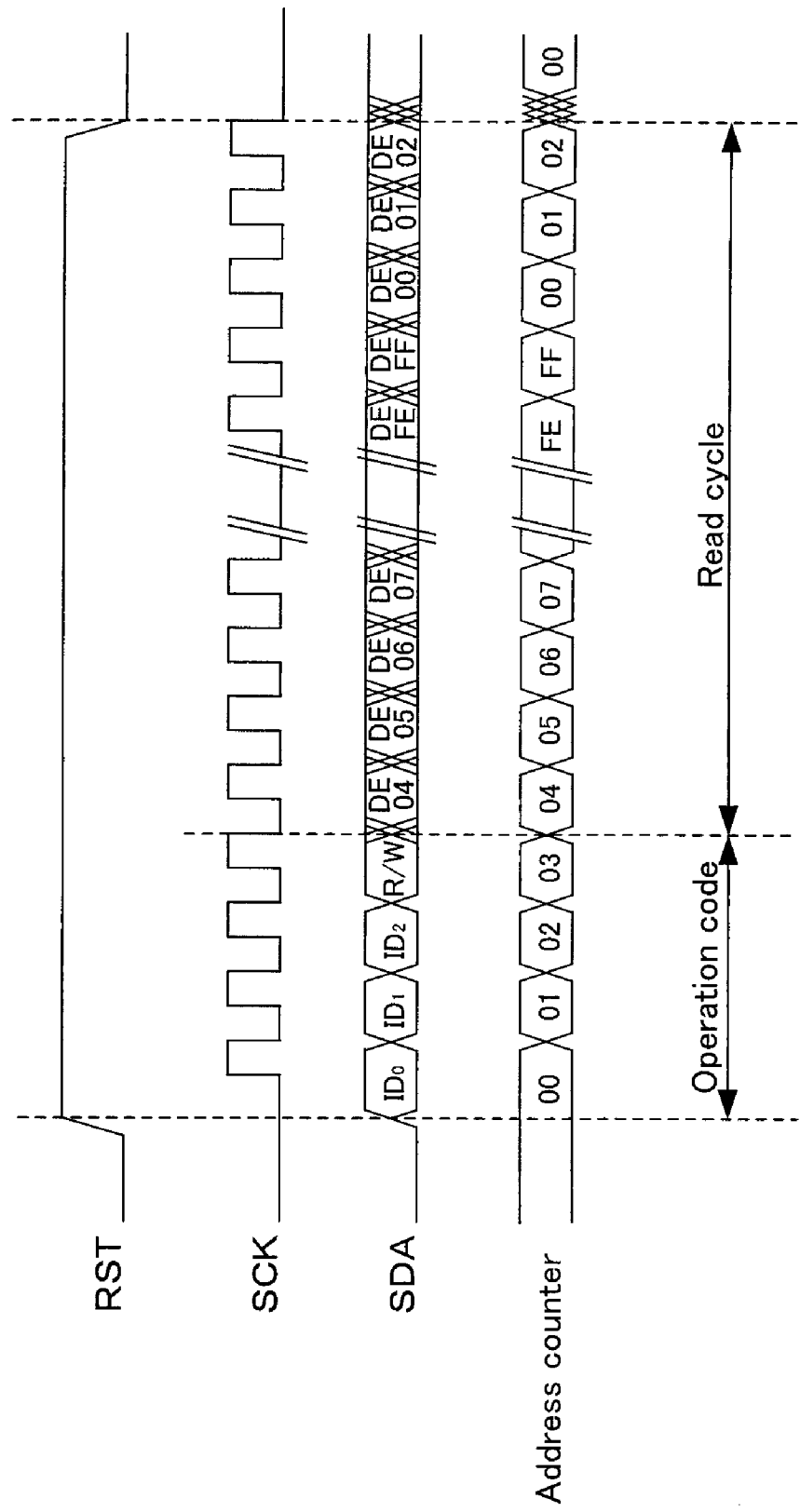
FIG. 3 is a timing chart showing the time relationship of the reset signal RST, the external clock signal SCK, the data signal SDA, and the address counter value during execution of the read operation.

The read operation at the semiconductor memory device 10 of this embodiment will be described while referring to FIG. 3. FIG. 3 is a timing chart showing the time relationship of the reset signal RST, the external clock signal SCK, the data signal SDA, and the address counter value during read operation execution.

Here is described the identification information confirmation and the read/write command confirmation process based on the operation code before the read operation. When the reset status (RST=0 or low) is cancelled (RST=1 or high), from a host computer that is not illustrated, the data signal SDA that contains the 4-bit operation code is synchronized with the outside clock signal and is input to the data signal terminal SDAT. As shown in FIG. 3, the operation code contains the leading 3 bits of identification information ID0, ID1, and ID2, and contained in the 4th bit from the start is a command bit for deciding write or read. The identification information comparison is executed as follows.

The ID comparator 130 fetches the data synchronized to the rising edge of the three clock signals SCK after the reset signal RST switches from low to high and input to the data signal terminal SDAT, specifically, the 3-bit identification information, and stores it in the 1st 3-bit register. Simultaneously with this, the ID comparator 130 fetches data from the memory array 100 addresses specified by the counter values 00, 01, and 02 of the address counter 110, specifically, fetches the identification information stored in the memory array 100, and stores this in the 2nd and 3rd bit registers.

The ID comparator 130 determines whether or not the identification information stored in the 1st and 2nd registers match, and when the identification information does not match, the high impedance state for the input signal line between the 8-bit latch register 170 and the in/out controller 120 is maintained by the in/out controller 120. Meanwhile, when the identification information stored in the 1st and 2nd registers match, the ID comparator 130 outputs an access enable signal AEN to the write/read controller 140. The write/read controller 140 that has received the access enable signal AEN fetches the command bit synchronized to the rising edge of the 4th clock signal SCK after switching the reset signal RST from low to high and sent to the bus signal line, and determines whether or not it is a write command. When the fetched command bit is not a write command, the write/read controller 140 outputs a read command to the in/out controller 120.

The in/out controller 12 that has received the read command changes the data transfer direction in relation to the memory array 100 to the read direction, and enables data transfer. The address counter 110 synchronizes to the falling edge of the clock signal SCK and counts up, so the counter value of the address counter 110 after input of the operation code is 04, and reading is done from the existing data DE stored in 04H of the memory array 100. The existing data DE stored in the memory array is synchronized to the falling edge of the clock signal SCK and output in sequence to the data signal terminal SDAT via the in/out controller 120, and the output existing data DE is held for the period until the next fall of the clock signal SCK. When the clock signal SCK falls, the count value for the address counter 110 is incremented by 1, and as a result, the existing data DE stored in the next address (data cell) for the memory array 100 is output to the data signal terminal SDAT. The repetition of this operation is executed synchronous to the clock signal SCK until the desired address is reached. Specifically, since the semiconductor memory device 10 of this embodiment is a sequential access type, the host computer must issue a number of clock signal pulses corresponding to the address requesting read or write, and increment the counter value of the address counter 110 until the count value corresponding to the specified address. As a result, the existing data DE is synchronized to the clock signal SCK and read sequentially from the address specified by the counter value of the sequentially incremented address counter 110.

The memory array 100 of the semiconductor memory device 10 of this embodiment only has addresses from 00H to BFH, but the address counter 110 executes counting up to the address FFH. From address C0H to FFH is a dummy area, and the corresponding addresses do not exist in the memory array 100, and during the time when this dummy area is accessed, the value 0 is output to the data signal terminal SDAT. When counting up is done to the address FFH by the address counter 110, the address returns to the address 00H. After the reading operation ends, a 0 or low reset signal RST is input from the host computer, and the semiconductor memory device 10 is in an operation code receive standby state.

When the reset signal RST (=0 or low) is input, the address counter 110, the in/out controller 120, the ID comparator 130, the write/read controller 140, and the increment controller 150 are initialized.

Write Process

Figure 4:
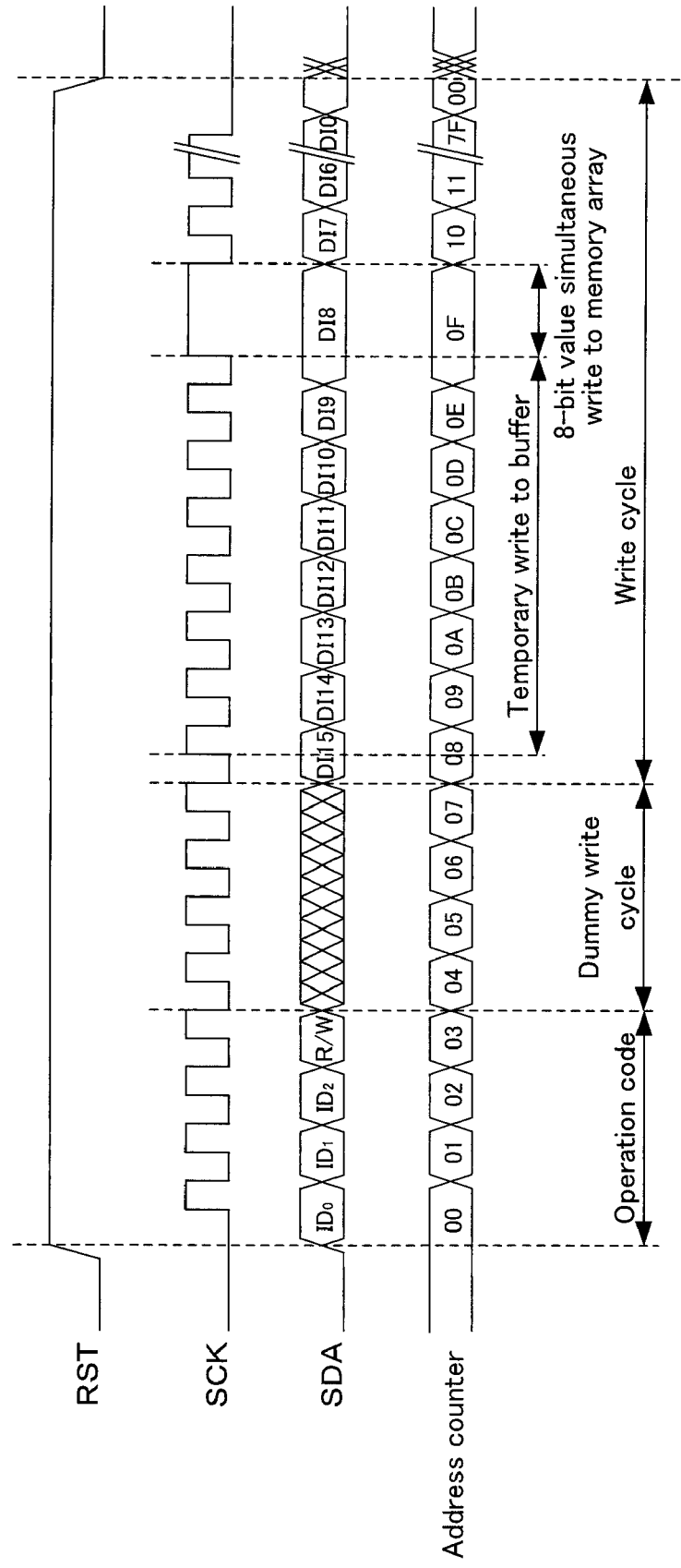
FIG. 4 is a timing chart showing the time relationship of the reset signal RST, the external clock signal SCK, the data signal SDA, and the address counter value during execution of the write operation.

The write operation of the semiconductor memory device 10 of this embodiment will be described while referring to FIG. 4. FIG. 4 is a timing chart showing the time relationship of the reset signal RST, the external clock signal SCK, the data signal SDA, and the address counter value during execution of the write operation. With the semiconductor memory device 10 of this embodiment, write is executed in row units (8-bit units), specifically, in a predetermined address unit (8 address units).

After the identification information match is confirmed by the ID comparator 130 already described, when the fetched command bit is a write command, and a write enable signal WEN1 is received from the increment controller 150, the write/read controller 140 outputs the write enable signal WEN2 to the in/out controller 120.

As shown in FIG. 4, after the operation code is input, 4 clock signals are input to the clock signal terminal SCKT as dummy write clocks, and a write standby state results. The address counter 110 counts up synchronous to the falling of the clock signal SCK, so the counter value of the address counter 110 after the write standby state is 08, and data is written from the address 08H of the memory array 100.

With this embodiment, 16-bit length write data is written to the one row, 8-bit memory array 100. During the writing process, first, 8 bits of data from the most significant bit (MSB) of the write data DI is synchronized to the rise of the clock signal SCK and latched sequentially to the 8-bit latch register 170. Also, until the write enable signal WEN2 is output to the in/out controller 120, existing data synchronized to the fall of the clock signal SCK after the 8th address of the memory array 100 is output sequentially on the data output signal line (data signal terminal SDA). The existing data DE output on the data output signal line is input to the increment controller 150, and together with the write data DI latched to the 8-bit latch register 170, as described later, this is used to determine whether or not the write data DI in the increment controller 150 is a value larger than the existing data DE. This determination process is executed after the rise of the clock signal SCK (=1 or high) of the 8th cycle after the write standby status.

The in/out controller 120 that received the write enable signal WEN2 changes the data transfer direction in relation to the memory array 100 to the write direction, cancels the high impedance setting of the signal line between the 8-bit latch register 170 and the in/out controller, and enables data transfer. As a result, the value (0 or 1) of the write data DI is transferred to each bit line of the memory array 100. The write/read controller 140 requests generation of the write voltage to the charge pump circuit 160 after the fall of the clock signal SCK after the 8th cycle after the write standby state, the generated write voltage is applied to the bit line selected by the column selection circuit 103, with this embodiment all the bit lines, and as a result, the 8 bits of data 1 and 0 stored in the 8-bit latch register 170 are written once to the write restricted row.

When the clock signal SCK of the 8th cycle falls, the count value of the address counter 110 is incremented by one, and fetching of the write data DI (2nd byte data) to be written to the next address (8 addresses) is executed. Also, during the clock low period after the clock signal SCK of the 8th cycle falls, the process of verifying whether or not the just written existing data DE and the write data DI used for writing match is executed. Specifically, during the time the clock is low, the count value for specifying the address of the 8 bits of existing data DE just written by the 4-bit counter 151 equipped in the increment controller 150 is input to the column selection circuit 103 and the row selection circuit 104. As a result, the just written 8 bits of existing data DE are output from the in/out controller 120 and stored in the 8-bit internal register 153 equipped in the increment controller 150 via the in/out controller 120. The increment controller 150 verifies whether or not the 8 bits of existing data DE stored in the 8-bit internal register 153 and the 8 bits of write data DI stored in the 8-bit latch register 170 match.

With this embodiment, the write data DI is data of 16-bit length, and since there are two rows of write restricted rows (8 addresses×2), when the aforementioned process is executed twice, the writing of the write data DI is completed. After completion of writing of the write data DI, the reset signal RST (=0 or low) is input from the host computer to the reset signal terminal RSTT, Note that the write data sent from the host computer, except for the data corresponding to the address requesting rewrite, has the same value (0 or 1) currently stored in the memory array 100. Specifically, the data of the address that cannot be rewritten for the memory array 100 is overwritten by the same value.

When the reset signal RST (=0 or low) is input, the address counter 110, the in/out controller 120, the ID comparator 130, the write/read controller 140, and the increment controller 150 are initialized.

Figure 5:
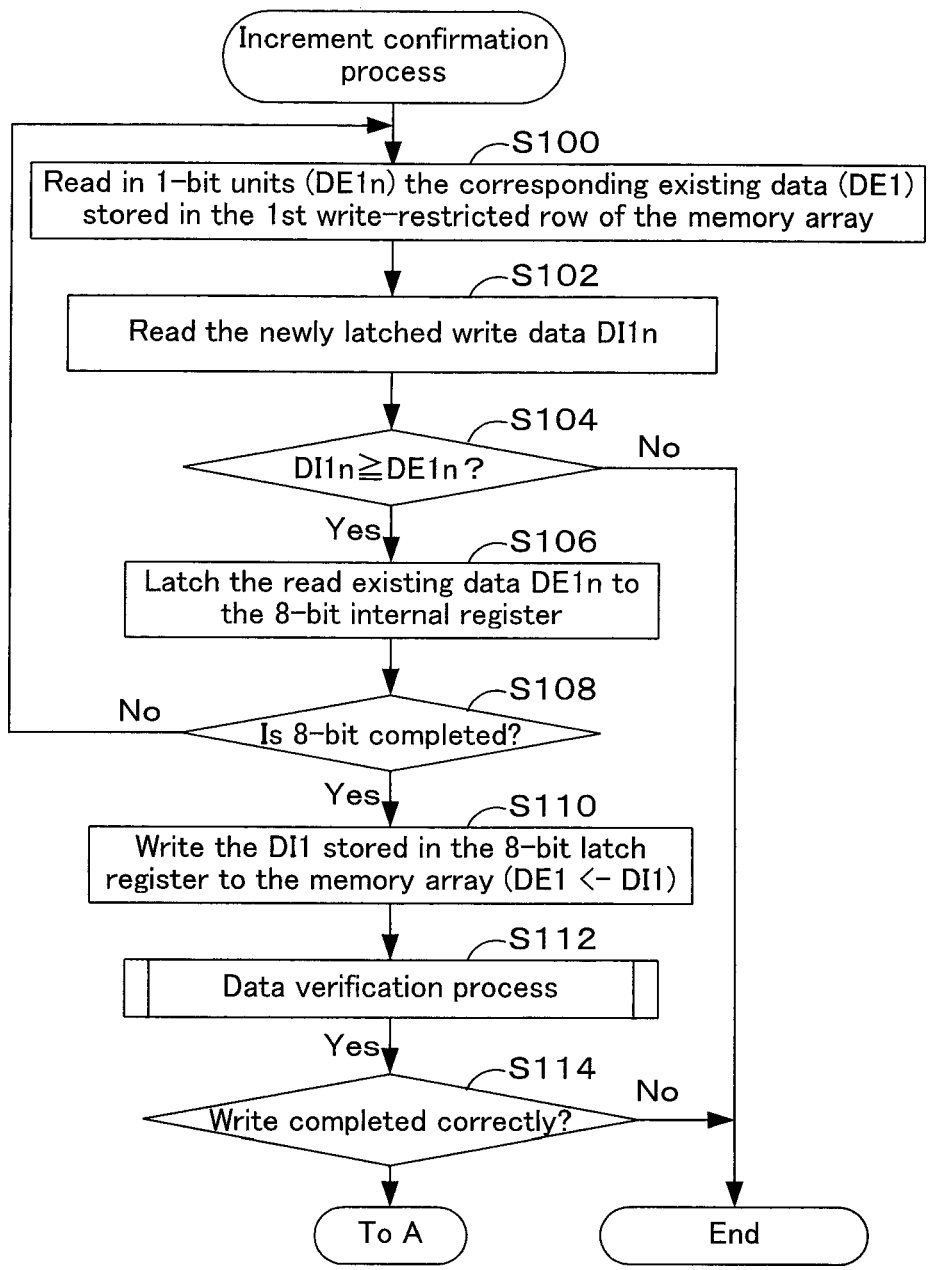
FIG. 5 is a flow chart showing the processing routine of the increment confirmation process for the write process executed by the semiconductor memory device of the first embodiment.
Figure 6:
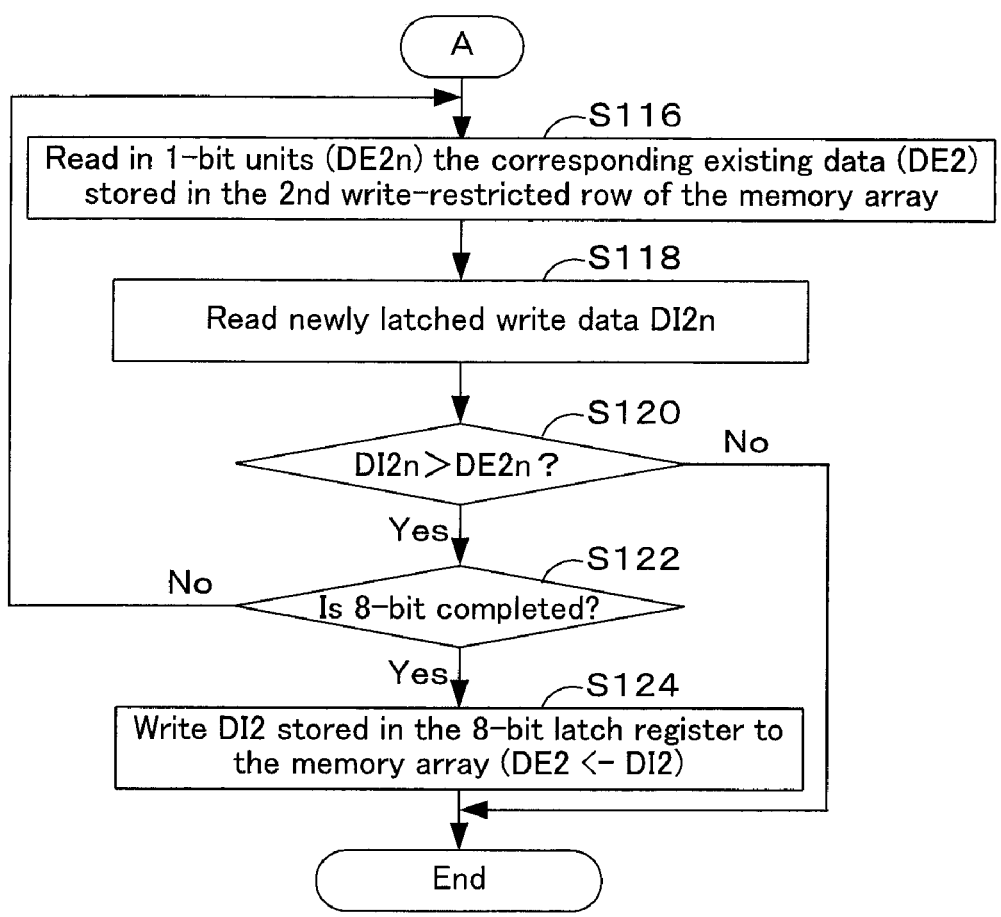
FIG. 6 is a flow chart showing the processing routine of the increment confirmation process of the write process executed by the semiconductor memory device of the first embodiment.
Figure 7:
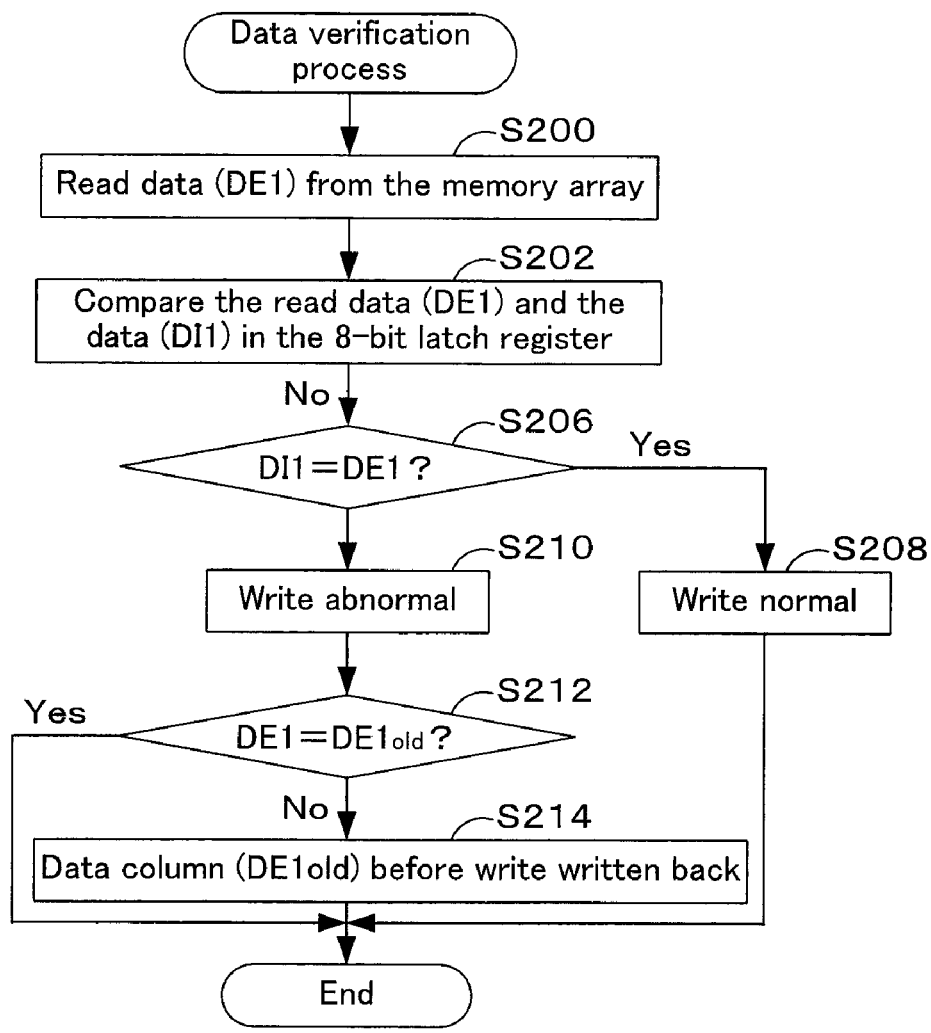
FIG. 7 is a flow chart showing the processing routine of the data verification process of the write process executed by the semiconductor memory device 10 of the first embodiment.
Figure 9:
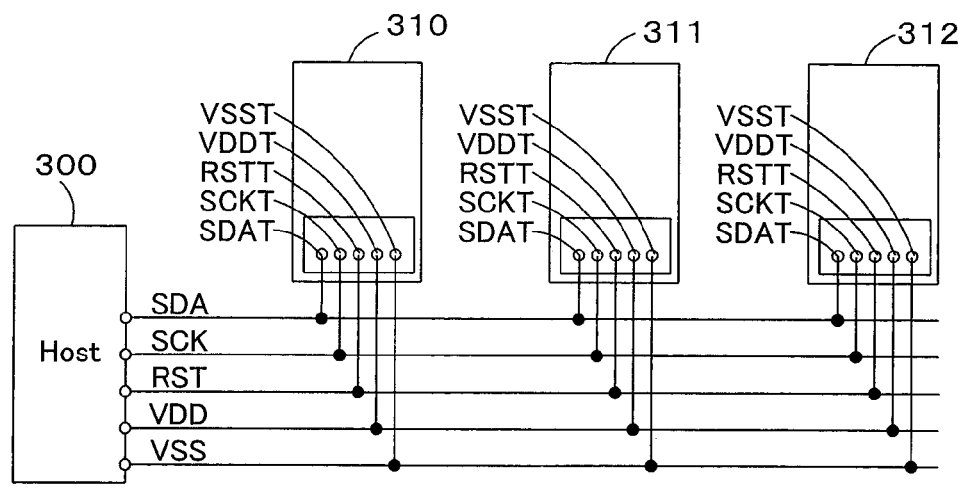
FIG. 9 is an explanatory drawing showing an application example of the semiconductor memory device of the first embodiment.

Increment Conformation Process:

The increment confirmation process and the data verification process for the write process executed by the semiconductor memory device 10 of this embodiment will be described while referring to FIG. 5 to FIG. 8. FIG. 5 and FIG. 6 are flow charts showing the processing routine of the increment confirmation process for the write process executed by the semiconductor memory device of the first embodiment. FIG. 7 is a flow chart showing the data verification process processing routine for the write process executed by the semiconductor memory device of the first embodiment. FIG. 8 is an explanatory drawing showing an example of the results of the increment confirmation process for the first embodiment.

When the write process starts, of the write data DI of 16 bit (2 byte) length, at the timing that the 1st byte write data DI1 is latched to the 8-bit latch register 170, the increment controller 150 reads in 1-bit units the corresponding existing data DE1 stored in the first write restricted row of the memory array 100 (step S100). Thereafter, each 1 bit of existing data DE1 that constitutes the 8 bits of existing data DE1 stored in the first write restricted row is regarded as the existing data DE1$n$ (n=1 to 8). Also, each 1 bit of the write data DI1 that constitutes the 8 bits of write data DI1 is regarded as the write data DI1$n$ (n=1 to 8).

Specifically, the increment controller 150 reads in 1-bit units the corresponding existing data DE1 stored in the first write restricted row of the memory array 100 output from the in/out controller 120 synchronous to the fall of the clock signal SCK used when latching each of the 2nd byte write data DI2$n$ to the 8-bit latch register 170. Note that the addresses of the memory array 100 for which the 1st byte of write data is to be written are 8 addresses corresponding to the 1st write restricted row and the 8 addresses are addresses of a specified unit.

The increment controller 150 reads the 1 bit of write data DI1 latched to the 8-bit latch register 170 at the current timing (step S102). Note that with this embodiment, the write data DI is input to the semiconductor memory device 10 in sequence from the most significant bit (MSB), and the write data DI1$n$ is latched sequentially using the MSB to the 8-bit latch register 170.

The increment controller 150 determines whether or not the value of the write data DI1$n$ read from the 8-bit latch register 170 is the same or greater than the value of the existing data DE1$n$ read from the 1st write restricted row of the memory array 100, specifically, if DI1$n$≧DE1$n$ (step S104). This processing routine ends when the increment controller 150 determines that DI1$n$<DE1$n$ (step S104: No). Specifically, writing of the write data DI1 is not executed.

When the increment controller 150 determines that DI1$n$≧DE1$n$ (step S106: Yes), the existing data DE1$n$ read from the 1st write restricted row is stored in the internally equipped 8-bit internal register 152 (step S106).

When the increment controller 150 determines whether or not the comparison of the 8-bit existing data DE1$n$ stored in the 1st write restricted row and the 8 bits of write data DI1$n$ stored in the 8-bit latch register 170 is completed (step S108), when it is determined that it is not completed (step S108: No), execution of steps S100 to S106 is repeated.

When the increment controller 150 determines that the comparison of the 8 bits of existing data DE1$n$ stored in the 1st write restricted row and the 8 bits of write data DI1$n$ stored in the 8-bit latch register 170 is completed (step S108: Yes), it writes the write data DI1 stored in the 8-bit latch register 170 to the 1st write restricted row of the memory array 100 (step S112). Specifically, the result is DE1<–DI1, and the write data DI1 becomes the new existing data DE1. In more detail, as described previously, the increment controller 150 does not directly execute writing of the write data DI1 to the memory array 100, but rather it outputs to the write/read controller 140 the write enable signal WEN1 that enables writing of the write data DI1 stored in the 8-bit latch register 170 to the 1st write restricted row of the memory array 100, and write is executed by the write/read controller 140 that received the write enable signal WEN1.

The increment controller 150 executes the data verification process (step S112), and when writing is completed correctly (step S114: Yes), the steps after A in FIG. 6 are executed. Meanwhile, the increment controller 150 executes the data verification process (step S112), and when writing was not completed normally (step S114: No), the write process ends.

The data verification process will be described while referring to FIG. 7. The increment controller 150 reads the just written existing data DE1 from the 1st write restricted row of the memory array 100 (step S200), and compares it with the write data DI1 stored in the 8-bit latch register 170 (step S210). In specific terms, the increment controller 150 has the 4-bit counter 151 count up using the internal clock signal generated by the internal oscillator 162 of the charge pump circuit 160 during the time the clock is low after writing of the first byte has ended. The increment controller 150 inputs the count value of the 4-bit counter 151 to the column selection circuit 103 and the row selection circuit 104, reads the just written 8 bits of existing data DE1 in address sequence from the 1st write restricted row of the memory array 100 via the in/out controller 120, and latches it to the 8-bit internal register 153. Specifically, the internal clock signal is output at an 8 bit (8 clock) delay from the write standby state.

The increment controller 150 determines whether or not the existing data DE1 latched to the 8-bit internal register 153 and the write data DI1 used for writing to the 1st write restricted row latched to the 8-bit latch register 170 (step S204). When the existing data DE1 stored in the 8-bit internal register 153 read from the 1st write restricted row matches the write data DI1 stored in the 8-bit latch register 170 (step S204: Yes), the increment controller 150 determines that the writing was completed correctly (step S206), and this processing routine ends.

When the existing data DE1 stored in the 8-bit internal register 153 read from the 1st write restricted row does not match the write data DI1 latched to the 8-bit latch register 170 (step S204: No), the increment controller 150 determines that the writing was not completed correctly, specifically, that the writing was abnormal (step S208). The increment controller 150 determines whether or not the existing data DE1 latched to the 8-bit internal register 153 read from the 1st write restricted row matches the existing data $DE1_{old}$ before writing stored in the 8-bit internal register 152 (step S210), and when it determines that $DE1=DE1_{old}$ (step S210: Yes), ends this processing routine. Meanwhile, when the increment controller 150 determines that $DE1 \neq DE1_{old}$ (step S210: No), it writes back the existing data $DE1_{old}$ before writing stored in the 8-bit internal register 152 to the 1st write restricted row of the memory cell 100 (step S212), and ends this processing routine. When it is determined that the writing is abnormal, the process of writing the remaining write data DI2 to the 2nd write restricted row is not executed.

The writing back process is executed in write processing cycles to the 2nd write restricted row. Specifically, during the 2nd byte write data DI2 write cycle, the existing data $DE1_{old}$ stored in the 8-bit latch is input to the in/out controller 120, and the same as the data input via the data signal terminal SDAT, the process of writing to the 1st write restricted row of the memory array 100 is executed. As a result, the data in the 1st and 2nd write restricted rows of the memory array 100 return to the value before execution of the write process.

Returning to FIG. 6, the increment confirmation process will be described. When, of the 16-bit length write data DI, writing of the 1st byte of write data DI1 is completed correctly, at the timing when the remaining 2nd byte write data DI2 is latched to the 8-bit latch register 170, the increment controller 150 reads in 1-bit units the corresponding existing data DE2 stored in the 2nd write restricted row of the memory array 100 (step S116). Thereafter, each 1 bit of existing data DE2 that constitutes the 8 bits of existing data DE2 stored in the 2nd write restricted row is regarded as existing data DE2$n$ (n=1 to 8).

Specifically, the increment controller 150 reads the corresponding existing data DE2$n$ stored in the 2nd write restricted row of the memory array 100 that is output from the in/out controller 120 synchronous with the fall of the clock signal SCK used when latching each 2 bytes of write data DI2$n$ to the 8-bit latch register 170. Note that the addresses of the memory array 100 to which the 1st byte of write data is to be written are the 8 addresses corresponding to the 2nd write restricted row, and the 8 addresses are addresses of the specified unit.

The increment controller 150 reads the write data DI2$n$ latched to the 8-bit latch register 170 at the current timing (step S118). Note that with this embodiment, the write data DI is input to the semiconductor memory device 10 in sequence from the most significant bit (MSB), and the write data DI2$n$ is sequentially latched using MSB to the 8-bit latch register 170.

The increment controller 150 determines whether or not the value of the write data DI2$n$ read from the 8-bit latch register 170 is a value greater than the value of the existing data DE2$n$ read from the 1st write restricted row of the memory array 100, specifically, whether DI2$n$>DE2$n$ (step S120). When the increment controller 150 determines that DI2$n \leq$ DE2$n$ (step S120: No), it ends this process routine. Specifically, the writing of the write data DI2 is not executed.

When the increment controller 150 determines that DI2$n$>DE2$n$ (step S120: Yes), it determines whether or not the comparison of the 8 bits of existing data DE2$n$ stored in the 2nd write restricted row and the 8 bits of write data DI2$n$ stored in the 8-bit latch register 170 is completed (step S122), and when it determines that it is not completed (step S122: No), repetition of steps S116 to S120 is executed.

When the increment controller 150 determines that the comparison of the 8 bits of existing data DE2$n$ stored in the 2nd write restricted row and the 8 bits of write data DI2$n$ stored in the 8-bit latch register 170 was completed (step S122: Yes), it writes the write data DI2 stored in the 8-bit latch register 170 to the 2nd write restricted row of the memory array 100 (step S124), and ends this process routine. Specifically, this results in DE2<–DI2, and the write data DI2 becomes the new existing data DE2. In more detail, as described previously, the increment controller 150 does not directly execute writing of the write data DI1 to the memory array 100, but rather enables writing of the write data DI2 stored in the 8-bit latch register 170 to the 2nd write restricted row of the memory array 100, outputs the write enable signal WEN1 to the write/read controller 140, and writing is executed by the write/read controller 140 that received the write enable signal WEN1.

A case of writing to the memory array 100 being enabled and a case of writing not being enabled will be described to show examples while referring to FIG. 8. In FIG. 8, the horizontal axis is used for the addresses of the memory array 100, with the left edge being the most significant bit (MSB) and the right edge being the least significant bit (LSB). The addresses 08 to 0F correlates to the 1st write restricted row, and the addresses 10 to 17 correlate to the 2nd write restricted row.

With the first example, the write data DI1 corresponding to the 1st write restricted row and the existing data DE1 match, and the write data DI2 corresponding to the 2nd write restricted row is greater than the existing data DE2, so writing is enabled.

With the second example, the write data DI1 corresponding to the 1st write restricted row and the existing data DE1 match, and the write data DI2 corresponding to the 2nd write restricted row is less than the existing data DE1, so writing is not enabled.

With the third example, the write data DI1 corresponding to the 1st write restricted row is greater than the existing data DE1, but the write data DI2 corresponding to the 2nd write restricted row is less than the existing data DE2, so writing is not enabled.

With the fourth example, the write data DI1 corresponding the 1st write restricted row is less than the existing data DE1, so regardless of the size relationship between the write data DI2 corresponding to the 2nd write restricted row and the existing data DE2, writing is not enabled.

Figure 10:
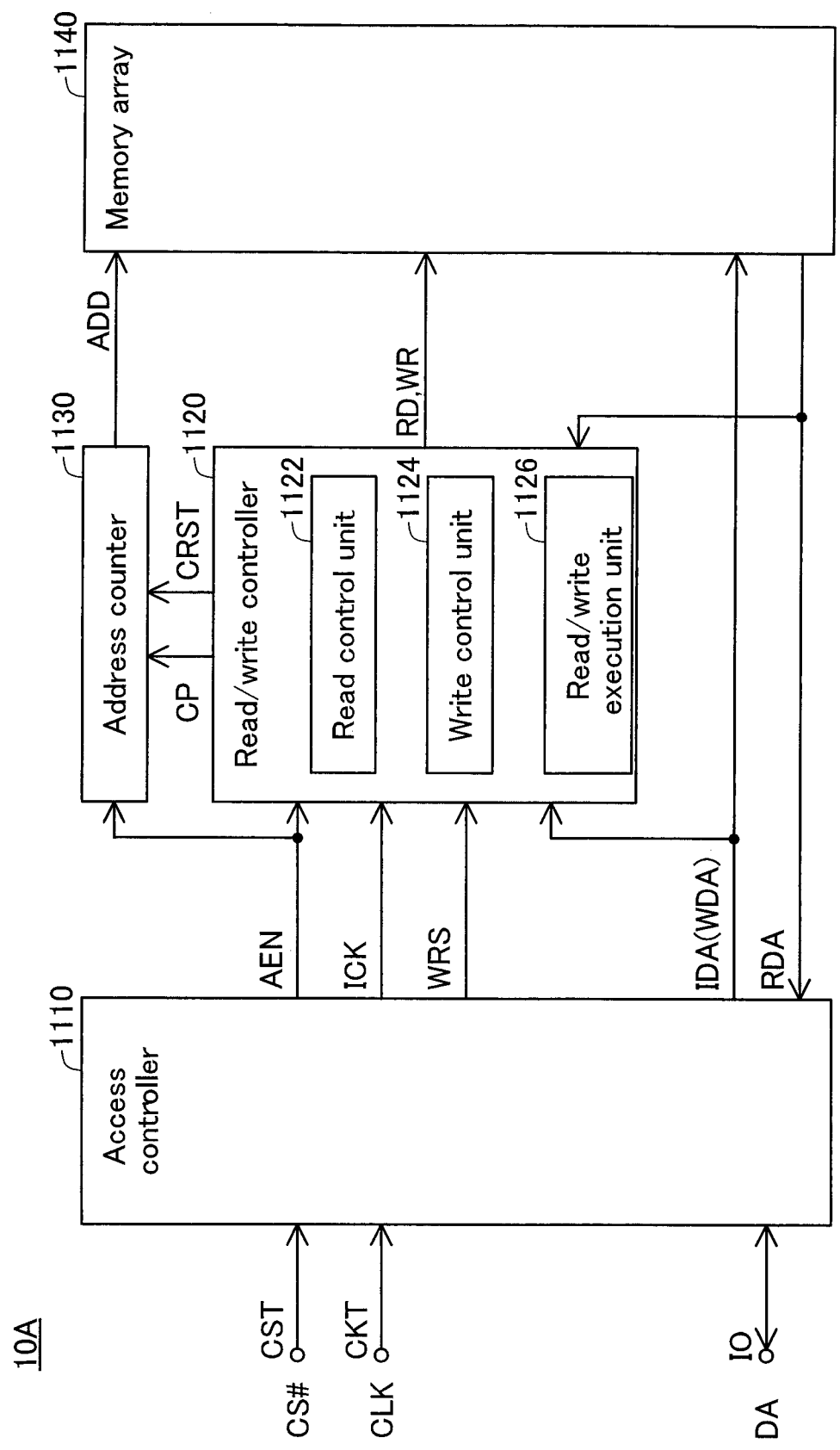
FIG. 10 is a block diagram illustrating the internal circuit structure of a semiconductor memory device according to a second embodiment.

An application example of the semiconductor memory device 10 of this embodiment is described while referring to FIG. 10. FIG. 10 is an explanatory drawing showing an application example of the semiconductor memory device of this embodiment. The semiconductor memory device 10 of this embodiment includes storage containers that store the consumer goods, for example, ink receptors 310, 311, and 312 that house inks as the print recording material. When each ink receptor 310, 311, and 312 is mounted in the printing device, there is a bus connection with the host computer 300 equipped in the printing device. Specifically, the data signal line SDA, the clock signal line SCK, the reset signal line RST, the positive electrode power supply line VDD, and the negative electrode power supply line VSS from the host computer 300 are connected with the semiconductor memory device 10 equipped with each ink receptor 310, 311, and 312.

As described above, with the semiconductor memory device 10 of this embodiment, only the write data DI of a value greater than the existing data DE is written to the semiconductor memory device 10. Therefore, it is possible to increase the update precision of data that has the characteristic of the value increasing. Specifically, in cases when the write data DI sent from the host computer changes to a value lower than the previous value due to noise, or when a value smaller than the previous value is mistakenly sent from the host computer, writing to the semiconductor memory device 10 is not executed. Therefore, when control of the device is performed using the consumption volume of consumer goods, for example when ink head empty shot prevention for an inkjet type printer is monitored using the ink consumption volume, it is possible to suppress or prevent damage to the ink head due to empty shots through higher precision.

Other Embodiments for the First Embodiment (1) With the aforementioned embodiment, when the write data DI2 has a value greater than the existing data DE2, writing to the 2nd write restricted row is enabled, but it is also possible to have write enabled when the write data DI2 and the existing data DE2 are equal. In this case, it is at least possible to decrease or prevent problems that come with data decrease without decreasing data relating to the consumption volume of consumer goods stored in the memory array 100. In this case, the existing data DE2 is overwritten by the same value write data DI2.

(2) With the aforementioned embodiment, described was a case when storing data with the characteristic of the value increasing in the semiconductor memory device, specifically, a case when recording the consumption volume of consumer goods, but it is possible to also enjoy the same benefit in a case when storing data of the characteristic of the value decreasing, specifically, the case when the remaining volume of the consumer goods is recorded. In this case, instead of the increment controller 150, it is also possible to provide a decrement controller that determines whether or not the write data DI is data of a value less than the existing data DE.

(3) With the aforementioned embodiment, an ink cartridge was used as the application example, but in addition to this, it is possible to obtain the same effects with a toner cartridge as well. It is also possible to obtain the same effect when using on a medium that stores money equivalent information such as a prepaid card or the like.

(4) With the aforementioned embodiment, the 4-bit counter and internal oscillator 162 were used for the verification process, but it is also possible to execute the verification process without using these circuits. Specifically, with the aforementioned embodiment, the verification process was executed with 8-bit units using the existing data DE1 latched to the 8-bit internal register 153 and the write [data] DI1 latched to the 8-bit latch register 170, but it is also possible to execute this with 1-bit units. In this case, the increment controller 150 does not have to be equipped with the 4-bit counter 151 and the 8-bit internal register 153.

In specific terms, at the timing when each bit of the 2nd byte write data DI2 is latched to the 8-bit latch register 170, the increment controller 150 reads in 1-bit units from the MSB the just written existing data DE1 from the 1st write restricted row of the memory array 100. For the reading of this existing data DE1, it is possible, for example, during the verification process (during latching of the 2nd byte write data DI2), for the column selection circuit 103 and the row selection circuit 104 to decrease by a count of 8 from the count value input from the address counter 110, and to select the read data of the memory array 100 using the decreased count value. Alternatively, it is also possible to have the column selection circuit 103 and the row selection circuit 104 to store the read addresses of one cycle previous, and to sequentially select the addresses stored based on the count value input from the address counter 110.

Meanwhile, since the 8-bit latch register 170 is a FIFO type register, the already latched write data DI1 is released in 1-bit units with each latching of the 2nd byte write data DI2 in 1-bit units. By comparing the 1st byte of write data DI1 released in 1-bit units using the MSB from the 8-bit latch register 170 and the read existing data DE1 in 1 bit units using the MSB from the 1st write restricted row of the memory array 100, the increment controller 150 is able to determine whether or not the write data DI1 to be written is correctly written to the 1st write restricted row of the memory array 100, specifically, whether the values of each bit match. By repeating this bit unit comparison process 8 times, it is possible to determine whether or not the 1st byte of write data DI1 is written correctly. When all the 8-bit existing data DE1 written to the 1st write restricted row are written correctly, after the increment confirmation process is executed on the 2nd byte write data DI2, writing of the write data DI2 to the 2nd write restricted row of the memory array 100 is executed.

(5) With the aforementioned embodiment, when as a result of the verification process, the 1st byte of write data DI1 is not correctly written to the 1st write restricted row, the existing data $DE1_{old}$ before writing latched to the 8-bit internal register 152 is written back to the 1st write restricted row, but it is also possible to not write this back. In this case as well, writing of the 2nd byte of write data DI2 to the 2nd write restricted row is not executed, and the lower 8 bit values are guaranteed to be correctly written values. Meanwhile, for the upper 8 bit values, generally, these are not values that change greatly during a short time, so by verifying the certainty with the previous values at the host computer, it is possible to avoid problems.

(6) With the aforementioned embodiment, examples of 16-bit length write data were described, but in addition to this, it is also possible to apply this in the same way also on data having a data length of multiples of the bit length of one row of the memory array 100, such as 24 bit length or 32 bit length, and it is also possible to obtain the same effects.

Second Embodiment

Structure of the Semiconductor Memory Device

A semiconductor memory device according to a second embodiment is a EEPROM that stores information in a non-volatile manner and that is accessed sequentially from a starting address in 1-bit units.

FIG. 10 is a block diagram illustrating the internal circuit structure of a semiconductor memory device according to the second embodiment. This semiconductor memory device 10A has an access controller 1110, a read/write controller 1120, an address counter 1130, and a memory array 1140.

The memory array 1140 has a memory area of a specific memory capacity, for example, 256 bits.

The address counter 1130 is a circuit that increments the counter value synchronized with a clock signal CLK that is inputted into a clock signal terminal CKT. More specifically, the address counter 1130 is a circuit that increments (counts-up) the counter value, synchronized with the count-up signal CP that is outputted from the read/write controller 1120. Note that the count-up signal CP is a clock signal that is outputted from the read/write controller 1120, and corresponds to the internal clock signal ICK. Moreover, the internal clock signal ICK is a clock signal that is outputted from the controller 1110, corresponding to the clock signal CLK. Consequently, the count-up signal CP is a clock signal corresponding to the clock signal CLK, where the address counter 1130 counts up the counter value synchronized with the clock signal CLK.

The counter value of the address counter 1130 is inputted into the memory array 1140 as the address ADD indicating a 256-bit memory area of the memory array 1140, where the location for writing, or location for reading, in the memory array 1140 is specified by the counter value of the address counter 1130.

The address counter 1130 is reset to the initial counter value when the counter reset signal CRST is inputted. Here the initial value need not necessarily be a value with any specific relationship to the starting position of the memory array 1140, and typically "0" is used as the initial value. Note that the counter reset signal CRST is outputted from the read/write controller 1120 at the beginning or the end of accessing (that is, at the beginning or end of reading or writing data), or when initializing the device.

Consequently, the address counter 1130 is able to specify sequential write locations or read locations in the memory array 1140 through the counter value that counts up sequentially from the initial value.

The access controller 1110 is connected to a chip select terminal CST, a clock signal terminal CKT and a data signal terminal IO, where the chip select signal CS# is inputted through the chip select terminal CKT, a clock signal CLK is inputted through the clock signal terminal CKT, and data signal DA is inputted or outputted through a data signal terminal IO. The clock signal CLK that has been inputted is sent to the read/write controller 1120 as the internal clock signal ICK. The data signal DA, if an input data signal, is sent to the read/write controller 1120 as the input data signal IDA, and send to the memory array 1140 as a write data signal WDA. If the data signal DA is an output data signal, then the read data signal RDA that is sent from the memory array 1140 is outputted as the data signal DA.

Moreover, the access controller 1110 controls the starting and stopping of access based on the chip select signal CS#, and the data signal DA that is inputted synchronized with the clock signal CLK. Specifically, when the chip select signal CS# is inputted and the command data that specifies either reading or writing data is inputted as the data signal DA, with timing that was established in advance, the access controller 1110 outputs the access enable signal AEN to the read/write controller 1120 and address counter 1130, and if the access that is specified is write access, the access controller 1110 controls the start of accessing by outputting a write access start signal WRS to the read/write controller 1120. Moreover, when the chip select signal CS# input has been terminated, the access controller 1110 terminates sending of the access control signal AEN, and if a write access start signal WRS is sent, the access is terminated by the termination of the transmission of this signal.

The read/write controller 1120 is provided with a read control unit 1122 that controls the data reading, a write control unit 1124 that controls the data writing, and a read/write execution unit 1126 that sends, to the memory array 1140, a read execution signal RD according to the instruction from the read control unit 1122 and that sends to the memory array 1140 a read execution instruction RD and a write execution instruction WR following the instructions received from the write control unit 1124, and executes control when data is read or written. Specifically, of the access enable signal AEN and the write start signal WRS from the access controller 1110, if only the AEN is received, then the read control unit 1122 and the read/write execution unit 1126 are actuated, and a read execute signal RD is sent to the memory array 1140, synchronized with the falling edge (rising edge) of the internal clock signal ICK to perform the process for reading the data. At this time, the read data included in the read data signal RDA from the memory array 1140 (termed simply "read data RDA") is inputted into the access controller 1110, and outputted through the data signal terminal IO as the output data signal DA. Moreover, when an access enable signal AEN and a write access write signal WRS are inputted from the access controller 1110, the write control unit 1124 and the read/write execution unit 1126 are actuated and a read execute signal RD is sent to the memory array 1140 synchronized with the falling edge (rising edge) of the internal clock signal ICK, while a write execute signal WR is outputted to the memory array 1140 synchronized with the rising edge (falling edge) of the internal clock signal ICK, and the data read out and data writing processes, described below, are performed. At this time, the data signal DA that is inputted into the access controller 1110 through the data signal terminal IO is sent to the memory array 1140 as the write data signal WDA, and the data that indicates the write data signal WDA (termed simply the "write data WDA") is written in the order in which it was inputted into the memory array 1140.

Note that a distinctive feature of the semiconductor memory device according to the present embodiment is the aspect that the data writing operation is by the write control unit 1124, and because, when it comes to the aspect wherein the data readout operation is through the read control unit 1122 is identical to that which is in the conventional semiconductor memory device, and so further explanations will be made below regarding the data write operations.

Write Operation:

As the prerequisites, it is assumed that multibit data, inputted sequentially through the data signal terminal IO as the data signal DA, is inputted one bit at a time beginning with the most significant bit (MSB), where access is performed with the memory area in the memory array 1140 starting with the address that is associated with the most significant bit.

Figure 11:
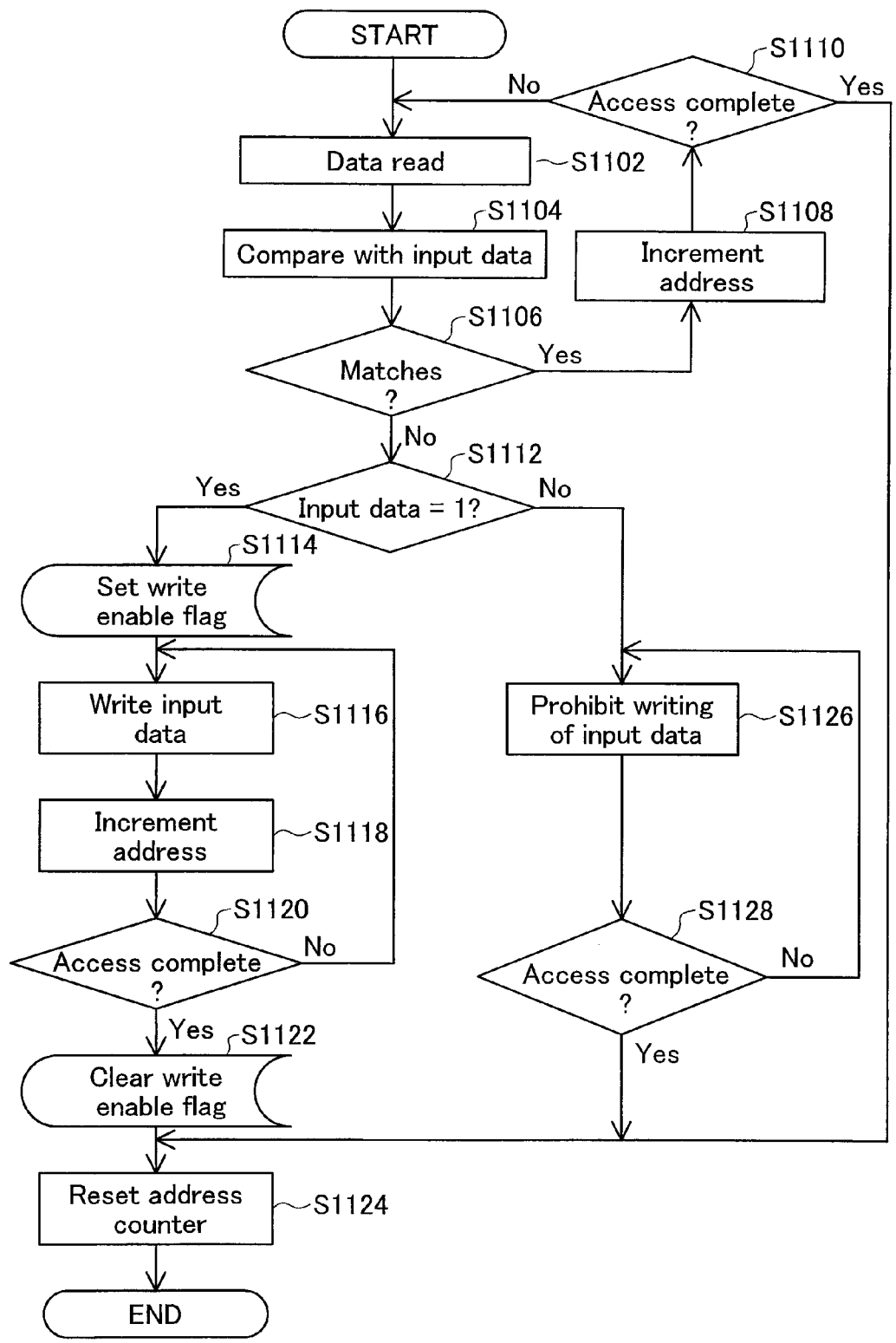
FIG. 11 is a flow chart illustrating the procedure in the data write operation according to the second embodiment.

FIG. 11 is a flow chart showing the sequence of steps for performing the data write operation in the second embodiment. As described above, this operation is able to input the access enable signal AEN into the read/write controller 1120 from the access controller 1110, and, when the write access start signal WRS is inputted, is performed by the write control unit 1124.

When the write operation is started, the write control unit 1124 performs the data reading in the read/write execution unit 1126 (Step S1102). For example, the read/write execution unit 1126 sends a read execute signal RD to the memory array 1140 synchronized with the falling edge of the internal clock signal ICK. At this time, the stored data (stored data) is read out from the memory area at the memory area location corresponding to the address value expressed by the address signal ADD that is outputted from the address counter 1130 of the memory array 1140, in response to the read execute signal RD. Note that the sending of the read execute signal RD is performed synchronized with the falling edge of the internal clock signal ICK, even in the other readout process, which will be described below.

Moreover, the write control unit 1124 compares the data that expresses the readout data signal RDA (hereinafter termed the "readout data") that is sent from the memory array 1140, readout as described above, to the data that expresses the input data signal IDA (termed simply "input data") that is sent from the access controller 1110, inputted through the data signal terminal IO (in Step S1104), and determines whether or not the readout data matches the input data (Step S1106).

If the value of the readout data matches the value of the input data (Step S1106: Yes), then the write control unit 1124 increments the counter value of the address counter 1130 by one (Step S1108), and then judges whether or not the access operation has been completed (Step S1110), and if the access operation is to be continued (Step S1110: No), then, again, the data read out is performed again in the read/write execution unit 1126 (Step S1102). For example, the read/write controller 1120 outputs the count-up signal CP to the counter 1130, synchronized with the next falling edge of the internal clock ICK after the read/write execution unit 1226 sends the read execution signal RD. At this time, the counter value of the counter 1130 is incremented by 1 following the count-up signal CP. Note that the counter 1130 increments the counter value each cycle with each falling edge of the count up signal CP, which corresponds to the internal clock signal ICK (the count-up timing).

Consequently, the write control unit 1124 repeats the data read out process (Step S1102) and the process of comparing with the input data (Step S1104) until the readout data and the read out data stop matching (Step S1106: No).

Note that the write control unit 1124, in determining the end of the aforementioned access operation (Step S1110), resets the counter value of the address counter 1130 (Step S1124) when it is determined that the access operation is to be terminated (Step S1110: Yes), thus completing the write operation. The decision as to whether or not the access operation has been completed can be made based on whether or not the chip select signal #CS or the access enable signal AEN is inputted. Specifically, it can be determined that the access operation has been completed when the signal that is used as the basis for the decision, for example, the access enable signal AEN is in a non-active state.

On the other hand, in the decision as to whether or not the value of the aforementioned readout data matches the value of the input data (Step S1106), if the value of the readout data does not match the value of the input data (Step S1106: No), then the write control unit 1124 determines whether or not the input data value is "1" (Step 1112).

If the value of the input data is "1" (Step S1112: Yes), then the write enable flag is set (Step S1114), and the writing is performed for the input data, as the write data, in the read/write execution unit 1126 (Step S1116). For example, the read/write execution unit 1126 sends the write execute signal WR to the memory array 1140 synchronized with the internal clock signal ICK. At this time, the input data (the write data) is written to the memory area in the memory area position that corresponds to the address value that is indicated by the address signal ADD that is outputted from the address counter 1130, in the memory array 1140.

Moreover, the write control unit 1124 increments, by one, the counter value of the address counter 1130, with the next count up timing (Step S1118), and then determines whether or not the access operation has been completed (Step 1120).

When the access operation is to be continued (Step S1120: No) then the data write process (Step S1116) and the address count up process (Step S1118) are executed again. On the other hand, when the access operation is completed (Step S1120: Yes), the write enable flag setting is cleared (Step S1122), and the counter value for the address counter 1130 is reset (Step S1124) to terminate the write operation.

Moreover, in the decision as to whether or not the aforementioned input data value is "1" (Step S1110), if the determination is that the input data value is not "1" (Step S1110: No), then the write control unit 1124 prohibits the writing of the input data (Step S1126) and stopping the operation of the read/write execution unit 1126 until the access operation is completed (Step S1128: No). On the other hand, if the access operation has been completed (Step S1128: Yes), then the counter value of the address counter 1130 is reset (Step S1124), and the write operation is terminated.

Next a specific example of the aforementioned write operation will be explained. The case of writing 4-bit binary data to a 4-bit memory area will be assumed for convenience in explanation. For example, the data (1010b) will be stored to each of the 4-bit memory areas. Note that the "b" in this value indicates that the value in binary data, where of the four "1" or "0" numbers, the one on the furthest left is the "MSB" (most significant bit), and the one furthest to the right is the "LSB" (least significant bit).

For example, when the input data (the write data) "1010b" is inputted sequentially, starting with the most significant bit on the left-hand side, the memory bits corresponding to these bits are compared sequentially. At this time, the input data and the stored data match for each bit, so the data write process is not performed.

Moreover, when the input data "1100b" is inputted, in contrast to the stored data "1010b" the second bit from the left in the input data is a "1," while the stored data value is "0," and so is a mismatch, and the input data value is "1," so the input data value is larger than the value of the stored data. The result is that the write enable flag is set, and "1" is written for the second bit from the left, "0" for the third bit, and "0" for the fourth bit, sequentially, where the data "1010b" that is stored in each of the four-bit memory regions is overwritten with the input data of "1100b".

Moreover, when input data of "1001b" is inputted, then, in relation to the stored data of "1010b," the "0" is the value of the input data that is the third bit from the left, and "1" is the corresponding value in the stored data, and so there is a mismatch; however, the value of the input data is "0," so the value of the input data is less than the value of the stored data. The result is that the write enable flag is not set, but rather the writing of the input data "1001b" is prohibited.

As explained in the above, in the write operation according to the second embodiment, the data is overwritten only when the value of the input data, as the write data, is larger than the value of the stored data, and if the write data is less than the stored data, then writing is prohibited. This makes it possible to prevent writing except for when writing in conformance with data conditions that have been set in advance.

Note that while in the write operation in the second embodiment described above, the input data was not written when the write data matched the stored data, instead the write enable flag may be set to write the input data so that the data writing is prohibited only in the case wherein the write data is smaller than the stored data.

Moreover, while in the write operation in the second embodiment, described above, the explanation was for writing the data sequentially in single-bit units, conversely, the data may be written in n-bit units instead. However, in such a case, there would be the need for a data buffer for holding the input data for each of the bits until all of the n bits of data have been inputted.

However, in the write operation in the second embodiment, the data can be overwritten only when the data condition of "the write data is larger than the stored data" is fulfilled. However, in order to reduce the write execution signal WR generation time, when, for example, the timing of the clock signal CLK, that serves as the reference for generating the write execution signal WR, is changed and the write operation is performed, there is the possibility that data may be written even if the data does not fulfill the data conditions. Given this, a semiconductor memory device according to the present invention that deals with this situation will be described below.

Third Embodiment

Structure of the Semiconductor Memory Device

The semiconductor memory device according to the third embodiment is a EEPROM wherein access is performed sequentially, beginning at a starting address, bitwise, along with storing the memory contents in a non-volatile manner, similar to the case in the second embodiment.

Figure 12:
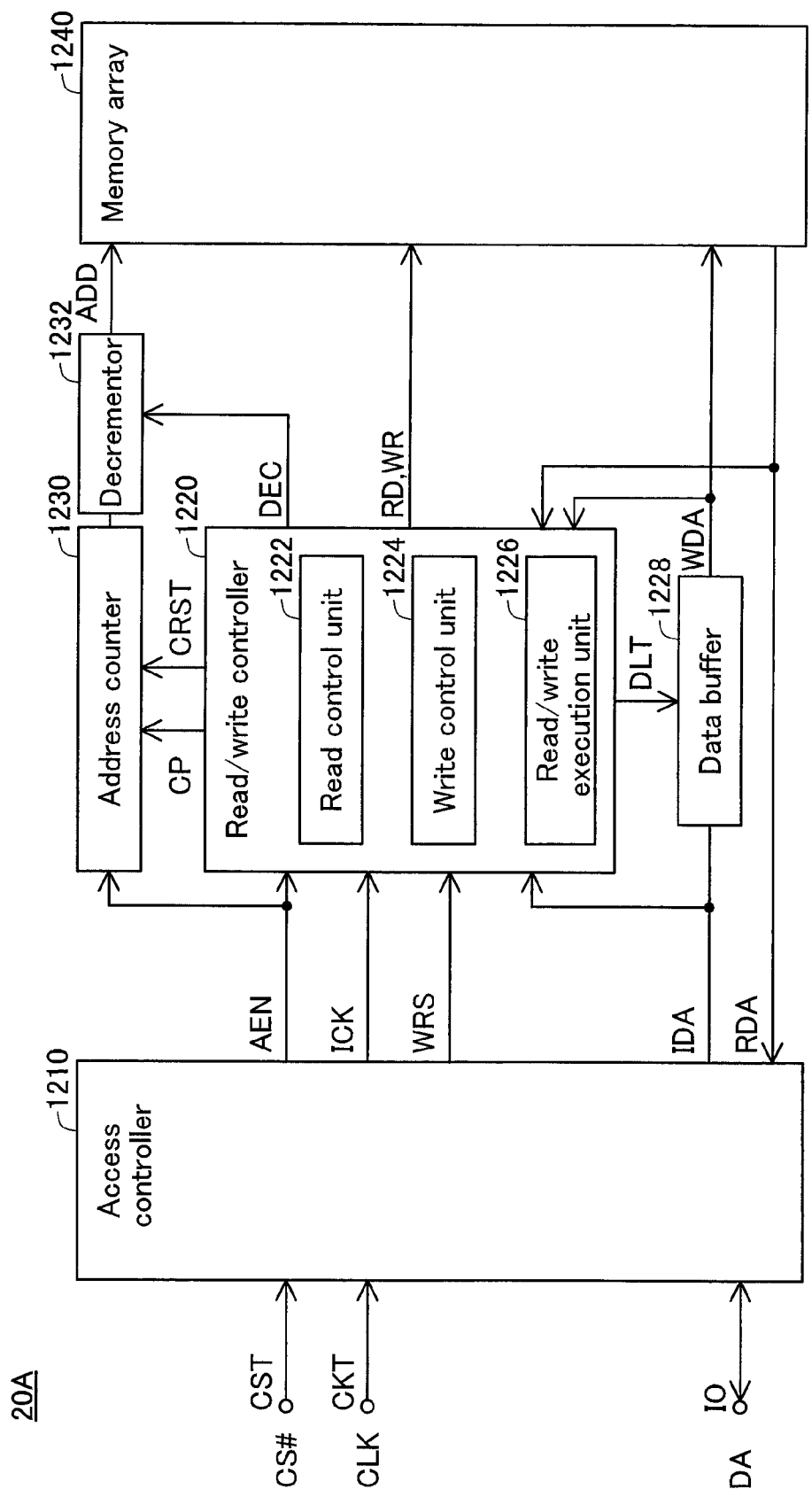
FIG. 12 is a block diagram illustrating the internal circuit structure of a semiconductor memory device according to a third embodiment.

FIG. 12 is a block diagram illustrating the internal circuit structure of the semiconductor memory device according to the third embodiment. This semiconductor memory device 20A is provided with not only an access controller 1210, a read/write controller 1220, an address counter 1230, and a memory array 1240, but also a data buffer 1228 and a subtracter 1232.

The access controller 1210, the address counter 1230, and the memory array 1240 are the same as the access controller 1110, the address counter 1130, and the memory array 1140 in the semiconductor memory device in the second embodiment. (See FIG. 10.)

The data buffer 1228 latches the input data signal IDA, from the access controller 1210, depending on the latch signal DLT that is inputted from the read/write controller 1220, and outputs, to the memory array 1140, the latched data as the write data signal WDA.

The subtracter 1232 sends, to the memory array 1140, an address that indicates the value wherein the counter value has been decremented (hereinafter termed the "decremented address") or the address that is expressed by the counter value of the address counter 1230 (hereinafter termed the "non-decremented address") as the address signal ADD according to the decrement signal DEC from the read/write controller 1220.

The read/write controller 1220 is provided with a read control unit 1222, a write control unit 1224, and a read/write execution unit 1226, and actually controls the access (data reading or data writing) in fundamentally the same manner as the read/write controller 1120 in the second embodiment. The read control unit 1222 and the read/write execution unit 1226 are the same as the read control unit 1122 and the read/write execution unit 1126 in the second embodiment.

The write control unit 1224 controls the operation of the address counter 1230, the read/write execution unit 1226, the data buffer 1228, and the subtracter 1232 to control the data write operation as described below.

Note that the data write operation part through the control of the write control unit 1224 is a distinctive feature in the semiconductor memory device in the present embodiment as well, where, when it comes to the aspect of the data read operation being performed by the read control unit 1122, this aspect is the same as in a conventional semiconductor memory device, so in the below the explanation will be of the data write operation by the write control unit 12.

Write Operations:

As with the case in the write operations in the second embodiment, it is assumed that multibit data, inputted sequentially through the data signal terminal IO, as the data signal DA, is inputted in single-bit units sequentially starting with the most significant bit (the MSB) where the memory area position in the memory array 1240 is accessed at an address from an address for which there is a defined relationship with the most significant bit.

Figure 13:
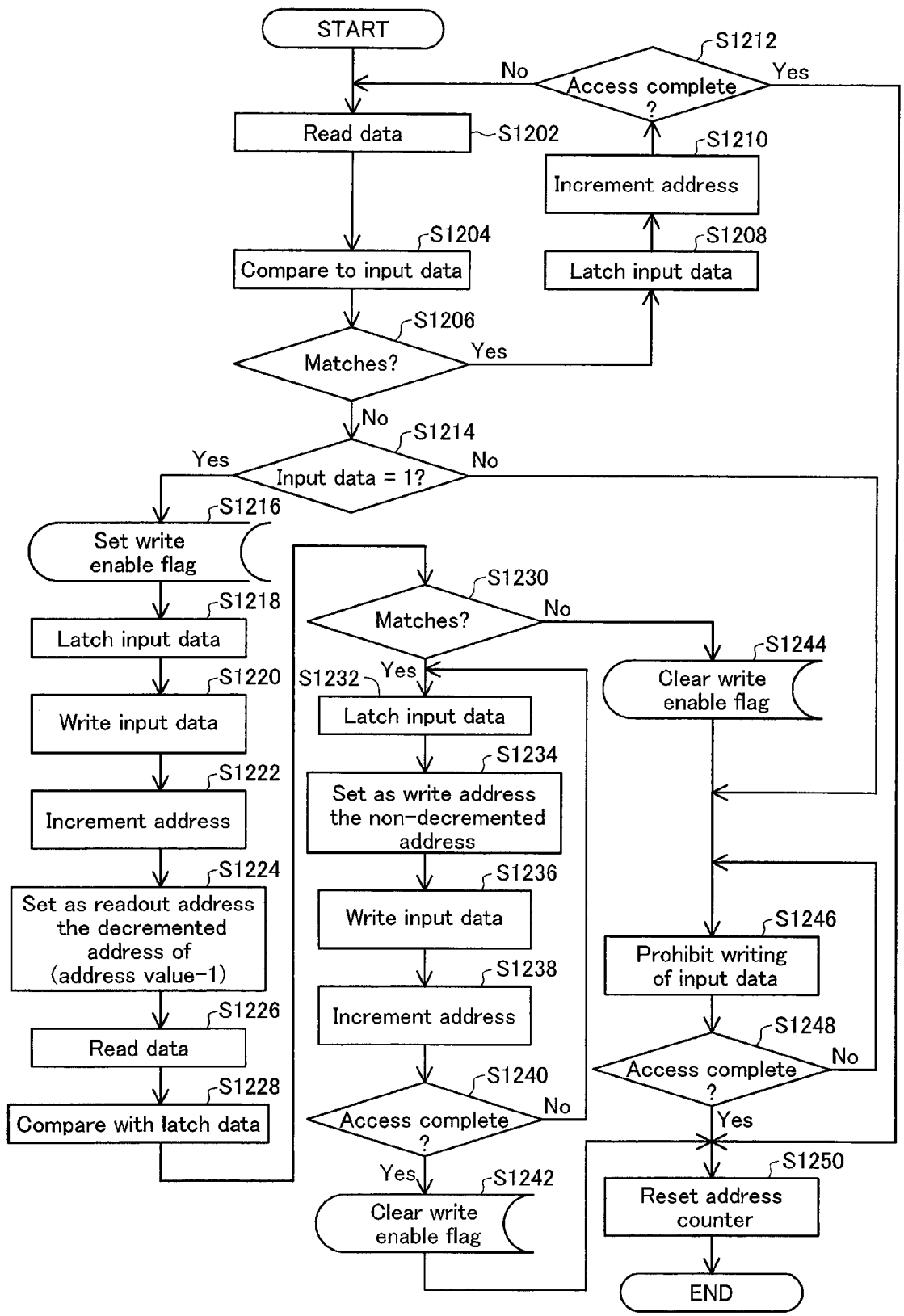
FIG. 13 is a flow chart illustrating the procedure in the data write operation according to the third embodiment.

FIG. 13 is a flow chart illustrating the process in the operation for writing data in the third embodiment. As with the second embodiment, in this operation, when an access enable signal AEN is inputted into the read/write controller 1220 from the access controller 1210 and a write access start signal WRS is inputted, then this operation is executed by the write control unit 1224.

When the write operation is started, the write control unit 1224 executes the data readout in the read/write execution unit 1226 (Step S1202). For example, the read/write execution unit 1226 sends a read execution signal RD to the memory array 1240 synchronized with the falling edge of the internal clock signal ICK. At this time, in accordance with the read execution signal RD, the data that is stored ("stored data") is read out from the memory area, in the memory array 1240, at the memory area position that corresponds to the address value that expresses the address signal ADD that is sent from the address counter 1230. Note that the outputting of the read execution signal RD is performed synchronized with the falling edge of the internal clock signal ICK, both here and in the other readout processes described below.

Moreover, the write control unit 1224 determine whether or not the value of the readout data matches the value of the input data (Step S1206) by comparing the input data to the data that is read out from the memory array 1240, read out as described above (Step S1204).

When the value of the readout data matches the value of the input data (Step S1206: Yes), then the write control unit 1224, after latching the input data in the data buffer 1228 (Step S1208), increments the counter value of the address counter 1230 by 1 (Step 1210), and then determines whether or not the access operation has been completed (Step S1212), and if the access operation is continuing (Step S1212: No), then causes the data readout to be performed again by the read/write execution unit 1126 (Step S1202). For example, the read/write controller 1220 sends a latch signal DLT to the data buffer 1228, synchronized with the rising edge of the internal clock signal ICK, after the read/write execution unit 1226 has send the read execution signal RD. At this time, the data (input data) that expresses the input data signal IDA that is sent from the access controller 1110 is latched in the data buffer 1228 in accordance with the latch signal DLT. Furthermore, the read/write controller 1220 sends, to the counter 1230, a count-up signal CP, synchronized with the next falling edge of the internal clock signal ICK after the read/write execution unit 1226 has sent a latch signal DLT to the data buffer 1228. At this time, the counter value of the counter 1230 is incremented by one in accordance with the count-up signal CP. Note that the data buffer 1228 latches the input data for each cycle with a timing (the latch timing) of the rising edge of each internal clock signal ICK. Moreover, the counter 1230 increments the counter value with each cycle with the timing (the count-up timing) of the falling edge of each of the count-up signals CP, which correspond to the internal clock signal ICK.

Consequently, the write control unit 1224 repeats the data readout process (Step S1202) and the input data comparison process (Step S1204) until the readout data and the input data no longer match (Step S1206: No).

Note that the write signal unit 1224, in determining the conclusion of the aforementioned access operation (Step S1212) resets the counter value of the address counter 1230 (Step S1250) if it is determined that the access operation is completed (Step S1212: Yes), to conclude the write operation. When the access operation is concluded, the decision can be made based on whether or not a chip select signal #CS or an access enable signal AEN is inputted. Specifically, the access operation can be determined to be completed if the signal that is the basis for the decision, for example, the access enable signal AEN, is in an inactive state.

On the other hand, when the write control unit 1224, in determining whether or not the readout data value matches the value of the input data (Step S1206), if the decision is that the value of the readout data does not match the value of the input data (Step S1206: No), then a decision is made whether or not the value of the input data is "1" (Step S1214).

If the value of the input data is "1" (Step S1214: Yes), then the write enable flag is set (Step S1216), and the input data is latched into the data buffer 1228 with the next latch timing (Step S1218), and the data write is executed by the read/write execution unit 1226 (Step S1220). For example, the read/write controller 1220 sends the latch signal DLT to the data buffer 1228, synchronized with the next rising edge of the internal clock signal ICK, after the read/write execution unit 1226 has outputted the read execution signal RD. At this time, the input data is latched into the data buffer 1228 in accordance with the latch signal DLT. Moreover, after the read execution signal RD has been sent, the read/write execution unit sends a write execution signal WR to the memory array 1240 synchronized with the next rising edge of the internal clock signal ICK. At this time, the input data (write data) is written to the memory area of the memory area position, within the memory array 1240, that corresponds to the address value that expresses the address signal ADD that is sent from the address counter 1230.

Moreover, the write control unit 1224 increments, by 1, the counter value of the address counter 1230 with the next address count-up timing (Step S1220).

Next, the write control unit 1224 sets (in Step S1124), as the readout address, an address (the decremented address), that has a value wherein the counter value (the address value) of the address counter 1230 has been decremented by "1," in a subtracter 1232, and causes the read/write execution unit 1226 to execute the data readout (Step S1226).

Moreover, the write control unit 1224 correlates the read data and the write data to compare the data (the latch data) that is latched in the data buffer 1228 (Step S1228) to determined whether or not the value of the readout data matches the value of the latch data (Step S1230).

If the value of the readout data matches the value of the latch data (Step S1230: Yes), then first the input data is latched (Step S1232) in the data buffer 1228 with the next latch timing, and the address with the counter value of the address counter 1230 (the non-decremented address) is set as the write address in the subtracter 1232 (Step 1234) to cause the input data to be written to the read/write execution unit 1126 as the write data (Step S1236).

Moreover, the write control unit 1224 increments the counter value of the address counter 1230 by 1 with the next count-up timing (Step S1238), to determine whether or not the access operation has been completed (Step S1240).

If the access operation is continuing (Step S1240: No), then again the processes from the input data latch process (Step 1232) to the address count-up process (Step 1238) are executed. On the other hand, if the access operation is to be terminated (Step 1240: Yes), then the write enable flag setting is cleared (Step S1242) to reset the counter value of the address counter 1230 (Step S1250) to conclude the write operation.

Moreover, the write control unit 1224, in determining whether or not the value of the aforementioned readout data matches the value of the latch data (Step S1230), clears the write enable flag setting (Step S1244) if the value of the readout data does not match the value of the latch data (Step S1230: No), and prohibits writing of the input data (Step S1246) until the access operation has been completed (Step S1248: No), preventing the operation of the read/write execution unit 1226. On the other hand, when the access operation has been concluded (Step S1248: Yes) then the counter value of the address counter 1230 is reset (Step S1250), concluding the write operation.

Next a specific example of the aforementioned operations will be explained. For convenience in the explanation, it will be assumed that four bits of data will be written to a four-bit memory area. For example, it is assumed that the data "1010b" has been written to each 4-bit memory area. Note that the "b" in this value indicates that the value is binary data, where, of these four 1s or 0s, the one on the left is the most significant bit (MSB) and the one on the right is the least significant bit (LSB).

For example, the input data (the write data) is inputted sequentially starting with the most significant bit on the left edge, and compared sequentially to the corresponding bits in the stored data "1010b." At this time, the value of the input data in the second bit from the left is "1," and the value of the stored data "0" do not match, and the value of the input data is "1," so the value of the input data is larger than the value of the stored data. The result is that the write enable flag is set, and the input data from each bit from the second bit through the fourth bit are read sequentially. Here, after the input data for the second bit from the left has been written, the data that has been written is read out, and if the value of the readout data is "0," then the write data value of "1" has not been written, so the writing of the third bit and fourth bit are prohibited.

As explained in the above, in the write operation in the third embodiment, the input data, as the write data, and the stored data, as the stored data, are compared bitwise sequentially from the most-significant bit to the least significant bit, and when the input data is the larger, then writing is enabled, and after the data has been written for that bit, a check is performed as to whether or not the data has been written correctly. Furthermore, if the writing has not been performed correctly, then the write enable is cancelled, making it possible to prohibit further writing. This makes it possible to strengthen the write protection, beyond that which is in the second embodiment, preventing writing except for under the prescribed data conditions.

Modified Examples of the Write Operation:

Although in the write operation in the aforementioned third embodiment it was explained that the write operation is performed sequentially bitwise, the writing may instead be performed by combining together data of n-bit units (where n is an integer no less than 2).

Figure 14:
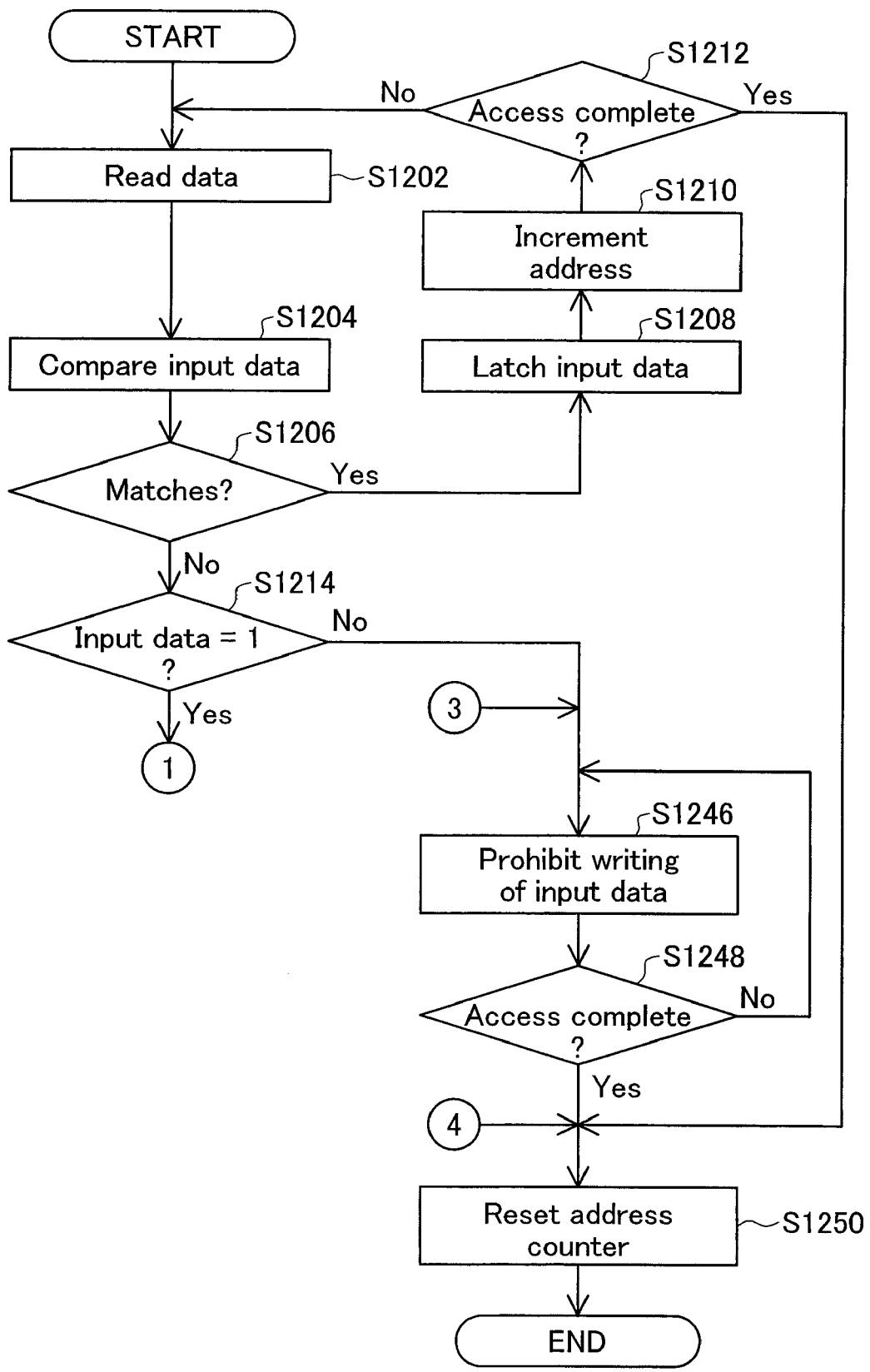
FIG. 14 is a flow chart illustrating the procedure of the data write operation in a modified example of the third embodiment.
Figure 15:
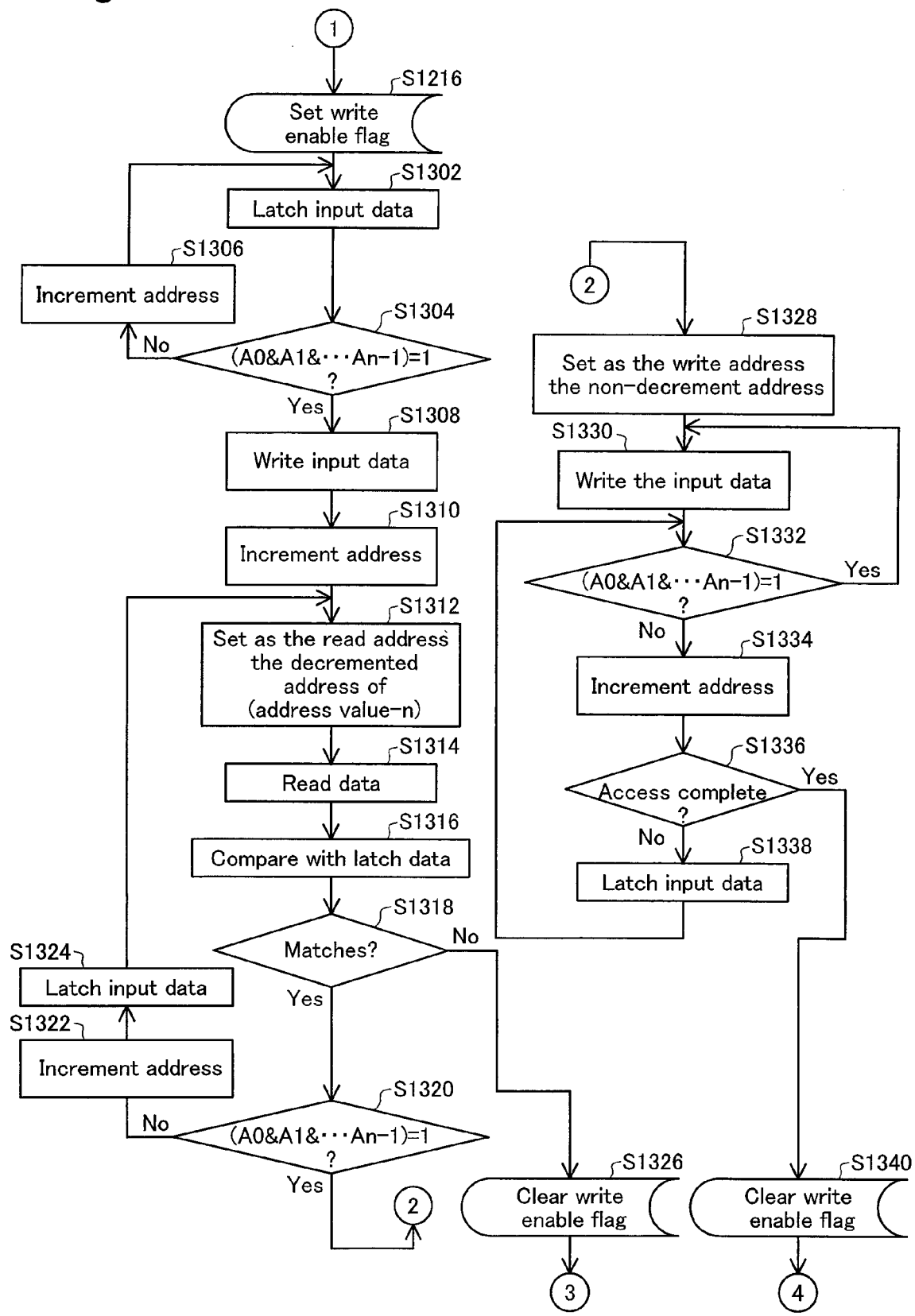
FIG. 15 is a flow chart illustrating the procedure of the data write operation in a modified example of the third embodiment.

FIG. 14 and FIG. 15 are flow charts illustrating the sequence for the write operations of data in a modified the third embodiment. In these operations, Step S1218 through Step S1244 in the write operation shown in FIG. 13 are modifications of Steps S1302 through S1340, where the processes are the same aside form these points that have been changed. Explanations regarding these changed processes will be described below.

When the write enable flag is set (Step S1216), with each latch timing the write control unit 1224 latches (in Step S1302), into the data buffer 1228, the input data that have been inputted sequentially, until each of the values of the lower n bits (A0, A1, ... An−1) of the address that is outputted from the address counter 1230 is "1," (Step S1304: No), and the counter value of the address counter 1230 is incremented sequentially (Step S1306) with each address count-up timing. Moreover, when all of the values of the address of the lower n bits are all "1," (Step S1304: Yes), the read/write execution unit 1226 is caused to execute, all at once, the writing of the latch data for the n bits that are latched in the data buffer 1228 (Step S1308), and then, with the next address count-up timing, the counter value of the address counter 1230 is incremented by one (Step S1310).

Next, the write control unit 1224 sets, as the readout address, a decremented address (Step S1312) wherein the counter value (the address value) from the address counter 1230 is decrement by n, into the subtracter 1232, and causes the read/write execution unit 1226 to perform the data readout (Step S1314).

Moreover, the write control unit 1224 correlates the readout data and the write data, and compares to the data (latch data) that is latched in the data buffer 1228 (Step S1316), to determine whether or not the value of the readout data matches the value of the latch data (Step S1318).

If the value of the readout data does not match the value of the latch data (Step S1318: No), the write enable flag setting is cleared (Step 1326), to prohibit the writing of the input data (Step S1246). On the other hand, if the value of the readout data matches the value of the latch data (Step S1318: Yes), then the address increment process (Step S1322), the input data latch process (Step S1324), the readout address setting process (Step S1312), the data readout process (Step S1314), the latch data comparison process (Step S1316), and the decision process (Step 1318) are repeated until all of the values for the lower n bits of the readout address, outputted from the address counter are "1" (Step S1320: No). On the other hand, when all of the values of the lower n bits of the readout address have gone to "1" (Step S1320: Yes), then a decremented address, expressing the counter value of the address counter 1230 is set as the write address in the subtracter 1232 (Step S1328) to cause the read/write execution unit 1126 to write, all at once, the n bits of latch data that are latched in the data buffer 1228 (Step S1330).

Next, the write control unit 1224 increments the counter value of the address counter 1230 by 1 with each address count-up timing (Step S1334) until each of the bit values for the lower n bits of the write address are "1" (Step S1332: No), and then if the access operation is not complete (Step S1336: No), latches the input data, with the corresponding latch timing (Step S1338). When the value for each bit in the lower n bits of the write address are all "1" (Step S1332: Yes), then the read/write execution unit 1126 is caused to simultaneously write the n bits of latch data that are latched in the data buffer 1228 (Step S1330).

If the access operation is completed (Step S1336: Yes), then the write enable flag setting is cleared (Step S1340), prohibiting the writing of the input data (Step S1246).

In the write operation described above, the n bits of data can all be written together.

Other Embodiments for the Second and Third Embodiments (1) While in the aforementioned second and third examples of embodiment an explanation was given regarding the capacity of the memory array being 256 bits, the present invention is not limited thereto, but rather the capacity of the memory may be modified as appropriate according to the amount of data that must be written.

(2) While in the second and third embodiment, described above, an explanation was given of the case wherein writing is enabled when the write data is larger than the stored data and writing was prohibited when the write data is smaller than the stored data, instead, writing may be enabled when the write data is smaller than the stored data, and writing may be prohibited when the write data is smaller than the stored data.

(3) While in the second and third examples of embodiment an explanation was given regarding the use of a EEPROM as the semiconductor memory device, insofar as the memory device is rewriteable and can maintain the data in a non-volatile state, the present invention is not limited to EEPROMs, but may be another memory device wherein memory is read out or written by a multi-bit unit.

As mentioned above, the semiconductor memory device of the present invention and the method of controlling writing for the semiconductor memory device have been described based on several embodiments, but the aforementioned embodiments of the invention are for making the present invention easy to understand, and do not limit the present invention. It is obvious that the present invention can be changed or improved without straying from the key points and claims scope, and that the present invention includes equivalent items.

What is claimed is:

1. A semiconductor memory device, comprising:
    a sequentially accessed non-volatile memory array that has a write restricted storage address of a predetermined address unit that stores data characterized by the value increasing;
    write data holding module that holds write data to be written to the write restricted storage address using a predetermined address unit;
    data writing module that writes the held write data to the write restricted storage address using the predetermined address unit;
    reading module that reads existing data stored in the write restricted storage address in the memory array;
    determination module that determines whether or not the value of the held write data is the value of the read existing data or greater; and
    a control unit that, when the value of the write data is the value of the existing data or greater, executes writing of the write data to the write restricted storage address of the memory array using the writing module.

2. A semiconductor memory device in accordance with claim 1, wherein
    when the value of the write data is less than the value of the existing data, the control unit does not execute writing of the write data to the write restricted storage address.

3. A semiconductor memory device in accordance with claim 1, wherein
    when the write restricted storage address count is n times (n is a natural number) of the predetermined address unit, the determination module determines whether or not the value of the write data is the value of the existing data or greater for each of the predetermined address units, and
    for all the write restricted storage addresses, when the value of the existing data is the value of the write data or greater, the control unit executes writing of the write data using the write module to all the write restricted storage addresses of the memory array.

4. A semiconductor memory device in accordance with claim 3, wherein
    for any of the addresses of the write restricted storage addresses, when the value of the write data is less than the value of the existing data, the control unit does not execute writing of the write data to all the write restricted storage addresses.

5. A semiconductor memory device in accordance with claim 1, wherein
    the determination module reads for each 1 address the write data from the write data holding module each time the existing data is read for each 1 address by the reading module, and determines whether or not the value of the write data is a value that is the value of the read existing data or greater.

6. A semiconductor memory device in accordance with claim 1, wherein
    the determination module uses the existing data of the predetermined address unit read for each 1 address by the reading module and the write data of the predetermined address unit held in the write data holding module, and determines whether or not the value of the write data is a value that is the value of the read existing data or greater.

7. A semiconductor memory device in accordance with claim 1, wherein
    data is stored in order from the most significant bit in the write restricted storage address in the memory array, and
    the data writing module executes writing of data in order from the most significant bit to the memory array.

8. A semiconductor memory device, comprising:
    a sequentially accessed non-volatile memory array that has a write restricted storage address of a predetermined address unit that stores data characterized by the value decreasing;
    write data holding module that holds write data to be written to the write restricted storage address using a predetermined address unit;
    data writing module that writes the held write data to the write restricted storage address using the predetermined address unit;
    reading module that reads existing data stored in the write restricted storage address in the memory array;
    determination module that determines whether or not the value of the held write data is the value of the read existing data or less; and
    a control unit that, when the value of the write data is the value of the existing data or less, executes writing of the write data to the write restricted storage address of the memory array using the writing module.

9. A semiconductor memory device in accordance with claim 8, wherein
    when the value of the write data is greater than the value of the existing data, the control unit does not execute writing of the write data to the write restricted storage address.

10. A semiconductor memory device that stores data characterized by the value increasing as rewritable data, comprising:
    a non-volatile memory array that is sequentially accessed and for which there are 8 data cells that store one bit of data per 1 row, and that has a write restricted row that stores the rewritable data;
    data receiving module that receives write data in 8 bit multiples to be written to the write restricted row of the memory array;
    write data holding module that holds 8 bits of write data of the received write data;
    data writing module that writes the held 8 bits of write data in 8-bit units to the write restricted row;
    reading module that reads existing data stored in the data cell of the write restricted row in the memory array;
    a determination module that determines for each 8-bit unit of write data whether or not the value of the write data is a value that is the value of the read existing data or greater; and
    a control unit that, when the value of the write data is the value of the existing data or greater for all the 8-bit unit write data, executes writing of the write data to all the subject data cells of the write restricted row using the writing module.

11. A semiconductor memory device in accordance with claim 10, wherein
    when the value of the write data is less than the value of the existing data for any of the 8-bit unit write data, the control unit does not execute writing of the write data to all the subject data cells of the write restricted row.

12. A semiconductor memory device in accordance with claim 10, wherein
    the determination module reads the write data from the write data holding module for each 1 bit with each time the existing data is read for each 1 bit by the reading module, and determines whether or not the value of the write data is a value that is the value of the read existing data or greater.

13. A semiconductor memory device in accordance with claim 10, wherein
the determination module uses the 8-bit multiple existing data read for each 1 bit by the reading module and the 8-bit multiple write data held in the write data holding module, and determines whether or not the value of the write data is a value that is the value of the read existing data or greater.

14. A semiconductor memory device in accordance with claim 10, wherein
data is stored in sequence from the most significant bit in the data cell of the write restricted row, and
the data write module executes writing of data in sequence from the most significant bit to the memory array.

15. A semiconductor memory device that stores data characterized by the value decreasing as rewritable data, comprising:
a non-volatile memory array that is sequentially accessed and for which there are 8 data cells that store one bit of data per 1 row, and that has a write restricted row that stores the rewritable data;
data receiving module that receives write data in 8 bit multiples to be written to the write restricted row of the memory array;
write data holding module that holds 8 bits of write data of the received write data;
data writing module that writes the held 8 bits of write data in 8-bit units to the write restricted row;
reading module that reads existing data stored in the data cell of the write restricted row in the memory array;
a determination module that determines for each 8-bit unit of write data whether or not the value of the write data is a value that is the value of the read existing data or less; and
a control unit that, when the value of the write data is the value of the existing data or less for all the 8-bit unit write data, executes writing of the write data to all the subject data cells of the write restricted row using the writing module.

16. A semiconductor memory device in accordance with claim 15, wherein
when the value of the write data is greater than the value of the existing data for any of the 8-bit unit write data, the control unit does not execute writing of the write data to all the subject data cells of the write restricted row.

17. A method of controlling writing of data to a semiconductor memory device that comprises a non-volatile memory array that has a write restricted storage address of a predetermined address unit that stores data characterized by the value increasing, and for which data is written in predetermined address units to the memory array, the method comprising:
reading the existing data stored in the write restricted storage address in the memory array;
determining whether or not the write data written to the write restricted storage address is a value that is the value of the read existing data or greater; and
writing the write data to the write restricted storage address in the predetermined address units when the write data value is the existing data value or greater.

18. A method of controlling writing of data to a semiconductor memory device that comprises a non-volatile memory array that has write restricted storage address of a predetermined address unit that stores data characterized by the value decreasing, and for which data is written in predetermined address units to the memory array, the method comprising:
reading the existing data stored in the write restricted storage address in the memory array;
determining whether or not the value of the write data written to the write restricted storage address is a value that is the value of the read existing data or less; and
writing the write data to the write restricted storage address in the predetermined address units when the write data value is the existing data value or less.

19. A method of controlling writing of data to a semiconductor memory device that comprises a non-volatile memory array that has a write restricted row to store rewritable data characterized by the value increasing, this being sequentially accessed and having 8 data cells that store 1 bit of data per 1 row, and for which the data is written in 8-bit units to the memory array, the method comprising:
receiving the write data in 8-bit multiples to be written to the memory array;
holding 8 bits of write data of the received write data;
reading the existing data stored in the data cell of the write restricted row in the memory array;
determining whether or not the value of the write data is a value that is the value of the read existing data or greater for each 8-bit unit write data, and
when the value of the write data is the value of the existing data or greater for all the 8-bit unit write data, writing the write data to all the data cells of the write restricted row.

20. A method of controlling writing of data to a semiconductor memory device that comprises a non-volatile memory array that has a write restricted row to store rewritable data characterized by the value decreasing, this being sequentially accessed and having 8 data cells that store 1 bit of data per 1 row, the method comprising:
receiving the write data in 8-bit multiples to be written to the memory array;
holding 8 bits of write data of the received write data;
reading the existing data stored in the data cell of the write restricted row in the memory array;
determining whether or not the value of the write data is a value that is the value of the read existing data or less for each 8-bit unit write data; and
when the value of the write data is the value of the existing data or less for all the 8-bit unit write data, writing the write data to all the data cells of the write restricted row.

21. A semiconductor memory device comprising:
a non-volatile memory array; and
a read/write controller that controls writing data to said memory array and reading data out of said memory array; wherein,
said read/write controller, when a request of writing data to said memory array is received, compares the value of multibit write data that has been inputted to the value of multibit stored data that is stored in a multibit memory area to which said multibit write data is to be written, then if for the value of each bit of said stored data there is a bit that is determined to fulfill a specific magnitude relationship, writes the write data for the bit that has been so determined, after which checks whether or not the stored data that has been stored in the memory area to which writing has been performed matches said write data for said bit that had been determined, if there is a match, writes the write data of a bit that is after said bit that had been determined, but if there is no match, prohibits the writing of the write data of all bits that are after said bit that had been determined.

22. A semiconductor memory device comprising:
a non-volatile memory array; and
a read/write controller that controls writing data to said memory array and reading data out of said memory array; wherein,
said read/write controller, when a request of writing data to said memory array is received, compares the value of multibit write data that has been inputted to the value of multibit stored data that is stored in a multibit memory area to which said multibit write data is to be written, with said comparison being performed bitwise manner beginning with the largest bit of said multibit write data, if for the value of each bit of said stored data there is a bit that is determined to fulfill a specific magnitude relationship, writes all at once for the write data for the n bits (where n is an integer of 2m, where m is a positive integer) starting with said bit that has been so determined, after which checks whether or not the stored data that has been stored in the memory area to which writing has been performed matches said write data for said bits that had been determined, wherein, if there is a match, writes in n-bit units for the write data of bits starting n bits after said bits that had been determined, but if there is no match, prohibits the writing of the write data of bits starting n bits after said bit that had been determined.

23. A method of controlling writing in a semiconductor device having a non-volatile memory array, the method comprising:
requesting for writing data to said memory array is received;
comparing the value of multibit write data to the value of multibit stored data, wherein the multibit write data is a data to be inputted, and wherein the value of multibit stored data is stored in a multibit memory area to which said multibit write data is to be written; and
implementing writing of said multibit write data that fulfills a specific magnitude relationship with the value of said stored data, prohibiting writing of said multibit write data that does not fulfill said magnitude relationship.

24. A method of controlling writing in a semiconductor device having a non-volatile memory array, the method comprising:
requesting for writing data to said memory array is received;
comparing the value of multibit write data to the value of multibit stored data in bitwise manner from the largest bit of the multibit write data, wherein the multibit write data is a data to be inputted, and wherein the value of multibit stored data is stored in a multibit memory area to which said multibit write data is to be written; and
if for the value of each bit of said stored data there is a bit that is determined to fulfill a specific magnitude relationship, writing the write data for a bit(s) following the bit that has been so determined, if there is no bit a that is determined to fulfill a specific magnitude relationship, prohibiting writing of the write data for a bit(s) following the bit that has been so determined.

25. A computer readable medium storing a computer program that controls writing in a semiconductor memory device having a non-volatile memory array, wherein the computer program is implemented in a computer and implements:
function of requesting for writing data to said memory array is received;
function of comparing the value of multibit write data to the value of multibit stored data, wherein the multibit write data is a data to be inputted, and wherein the value of multibit stored data is stored in a multibit memory area to which said multibit write data is to be written; and
function of implementing writing of said multibit write data that fulfills a specific magnitude relationship with the value of said stored data, and function of prohibiting writing of said multibit write data that does not fulfill said magnitude relationship.

26. A computer readable medium storing a computer program that controls writing in a semiconductor memory device having a non-volatile memory array, wherein the computer program is implemented in a computer and implements:
function of requesting for writing data to said memory array is received;
function of comparing the value of multibit write data to the value of multibit stored data in bitwise manner from the largest bit of the multibit write data, wherein the multibit write data is a data to be inputted, and wherein the value of multibit stored data is stored in a multibit memory area to which said multibit write data is to be written; and
if for the value of each bit of said stored data there is a bit that is determined to fulfill a specific magnitude relationship, function of writing the write data for a bit(s) following the bit that has been so determined, and if there is no bit a that is determined to fulfill a specific magnitude relationship, function of prohibiting writing of the write data for a bit(s) following the bit that has been so determined.

27. A print recording material container for containing a print recording material, detachably mounted onto a printing device, comprising:
a container part for containing said print recording material; and
a semiconductor memory device as set forth in any of claims 1-16 or 21 or 22 for storing information pertaining to the quantity of said print recording material.

28. A semiconductor memory device comprising:
a non-volatile memory array for storing consumable material quantity data that is data pertaining to quantities of consumable materials and that has a characteristic that increases the value;
data writing module that writes new consumable material quantity data that is to be stored in said memory array;
readout module that reads out, from said memory array, consumable material quantity data that has already been stored, and
a control unit that executes the writing of new consumable material quantity data, through said data writing module when said new consumable material quantity data is equal to or greater than said existing consumable material quantity data, without writing said new consumable material quantity data, using said data writing module, when the value of said new consumable material quantity data is less than the value of said existing consumable material quantity data.

29. A print recording material container for containing a print recording material, detachably mounted onto a printing device, comprising:
a container part for containing said print recording material; and a semiconductor memory device as set forth in claim 28 for storing information pertaining to the quantity of said print recording material.

30. A printing system comprising a printing device and a print recording material container as set forth in claim 27 that is detachably mounted onto said printing device; wherein
said printing device includes a host computer, wherein the host computer is connected to a semiconductor memory device of the print recording material receptor through a data signal line, a clock signal line, a reset signal line, a positive power supply line and a negative power supply line, and sends data of the quantity of the print recording material consumed in the printing device to the semiconductor memory device; and said semiconductor memory device attached to said print recording material receptor stores, in said memory array, the quantity data regarding the print recording material that has been received.

31. A printing system comprising a printing device and a print recording material container as set forth in claim 29 that is detachably mounted onto said printing device; wherein said printing device includes a host computer, wherein the host computer is connected to a semiconductor memory device of the print recording material receptor through a data signal line, a clock signal line, a reset signal line, a positive power supply line and a negative power supply line, and sends data of the quantity of the print recording material consumed in the printing device to the semiconductor memory device; and said semiconductor memory device attached to said print recording material receptor stores, in said memory array, the quantity data regarding the print recording material that has been received.

* * * * *